US012664937B2

(12) United States Patent
Li et al.

(10) Patent No.: US 12,664,937 B2
(45) Date of Patent: Jun. 23, 2026

(54) DISPLAY PANEL AND DISPLAY APPARATUS

(71) Applicant: Shanghai Tianma Microelectronics Co., Ltd., Shanghai (CN)

(72) Inventors: Xiongping Li, Shanghai (CN); Yimiao Ding, Shanghai (CN); Ronghua Li, Shanghai (CN); Zhenhai Yin, Shanghai (CN); Rong Zhang, Shanghai (CN); Yuewei Zhang, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 126 days.

(21) Appl. No.: 18/591,422

(22) Filed: Feb. 29, 2024

(65) Prior Publication Data

US 2024/0282261 A1 Aug. 22, 2024

(30) Foreign Application Priority Data

Aug. 15, 2023 (CN) ......................... 202311032437.9

(51) Int. Cl.
*G09G 3/32* (2016.01)
*G09G 3/3233* (2016.01)
*G09G 3/3291* (2016.01)

(52) U.S. Cl.
CPC ............. *G09G 3/3233* (2013.01); *G09G 3/32* (2013.01); *G09G 3/3291* (2013.01);
(Continued)

(58) Field of Classification Search
CPC ...... G09G 3/3233; G09G 3/32; G09G 3/3291; G09G 2300/043; G09G 2300/0842; G09G 2310/0297
See application file for complete search history.

(56) References Cited

U.S. PATENT DOCUMENTS 8,994,619 B2 * 3/2015 Jeong ................... G09G 3/3233 345/82
9,269,294 B2 * 2/2016 Eom .................... G09G 3/3208
(Continued)

FOREIGN PATENT DOCUMENTS

CN 111312154 A 6/2020
CN 111951718 A 11/2020
(Continued)

OTHER PUBLICATIONS

Office Action mailed Jan. 22, 2026, issued in corresponding Chinese Patent Application No. 202311032437.9 filed Aug. 15, 2023, 22 pages.

*Primary Examiner* — Sejoon Ahn
(74) *Attorney, Agent, or Firm* — CHRISTENSEN O'CONNOR JOHNSON KINDNESS PLLC

(57) ABSTRACT

A display panel includes light-emitting devices and pixel circuits. The pixel circuit includes a driving module, a data writing module, and a light-emitting control module. In an embodiment, the pixel circuit comprises first working modes and second working modes. In an embodiment, the data writing module transmits different data voltages to the driving module in at least two of the first working modes. The data writing module transmits a same data voltage to the driving module in any one of the second working modes. Durations taken by the light-emitting control module to control the driving module to transmit a driving current to the light-emitting device in any one of the first working modes are the same. Durations taken by the light-emitting control module to control the driving module to transmit a driving current to the light-emitting device in at least two of the second working modes are different.

18 Claims, 44 Drawing Sheets

(52) U.S. Cl.
CPC ................. *G09G 2300/043* (2013.01); *G09G 2300/0842* (2013.01); *G09G 2310/0297* (2013.01)

(56) References Cited

U.S. PATENT DOCUMENTS

| | | | | |
|---|---|---|---|---|
| 10,699,640 | B2 * | 6/2020 | Zhou | G09G 3/325 |
| 11,521,549 | B2 * | 12/2022 | Kuang | G09G 3/3291 |
| 2012/0153869 | A1 * | 6/2012 | Sadwick | H05B 45/50<br>315/307 |
| 2013/0193879 | A1 * | 8/2013 | Sadwick | H05B 45/385<br>315/307 |
| 2013/0217341 | A1 * | 8/2013 | Jones | H03F 3/211<br>455/73 |
| 2013/0264961 | A1 * | 10/2013 | Chang | H04B 10/802<br>315/201 |
| 2013/0271221 | A1 * | 10/2013 | Levesque | H03F 3/19<br>330/294 |
| 2013/0293139 | A1 * | 11/2013 | Sadwick | H05B 47/175<br>315/224 |
| 2013/0293310 | A1 * | 11/2013 | Levesque | H03F 3/21<br>323/311 |
| 2013/0307616 | A1 * | 11/2013 | Berchtold | H03F 3/211<br>323/318 |
| 2014/0152719 | A1 * | 6/2014 | Jung | G09G 3/3233<br>345/691 |
| 2014/0265935 | A1 * | 9/2014 | Sadwick | H05B 45/56<br>315/307 |
| 2017/0061878 | A1 * | 3/2017 | Park | G09G 3/3233 |
| 2019/0066587 | A1 * | 2/2019 | Han | H10D 86/60 |
| 2019/0156752 | A1 * | 5/2019 | Qian | G09G 3/3258 |
| 2020/0184894 | A1 * | 6/2020 | Shi | G09G 3/32 |
| 2022/0215797 | A1 * | 7/2022 | Zhai | G09G 3/3225 |
| 2024/0282261 | A1 * | 8/2024 | Li | G09G 3/3291 |

FOREIGN PATENT DOCUMENTS

| | | | |
|---|---|---|---|
| CN | 212724668 | U | 3/2021 |
| CN | 115527483 | A | 12/2022 |

* cited by examiner

DISPLAY PANEL AND DISPLAY APPARATUS

CROSS-REFERENCE TO RELATED APPLICATION

The present disclosure claims priority to Chinese Patent Application No. 202311032437.9, filed on Aug. 15, 2023, the content of which is incorporated herein by reference in its entirety.

TECHNICAL FIELD

The present disclosure relates to the field of display technologies, and in particular, to a display panel and a display apparatus.

BACKGROUND

With the continuous development of display technologies, increasingly high requirements are imposed on a display picture. Improvement of quality of the picture on a display panel has become an important direction in the development of the display technologies. A grayscale of the display panel plays a key role to affect the quality of the display picture.

At present, the display panel is driven actively in most cases. That is, a light-emitting device in the display panel is driven by a pixel circuit composed of transistors. However, the existing driving method is prone to a grayscale missing problem of the display panel.

SUMMARY

One aspect of the present disclosure provides a display panel. In an embodiment, the display panel includes light-emitting devices and pixel circuits. In an embodiment, an output terminal of one of the pixel circuits is electrically connected to at least one of the light-emitting devices. In an embodiment, one of the pixel circuits comprises a driving module, a data writing module, and a light-emitting control module. In an embodiment, both the data writing module and the light-emitting control module are electrically connected to the driving module. In an embodiment, one of the pixel circuits has first working modes and second working modes. In an embodiment, the data writing module transmits different data voltages to the driving module in at least two of the first working modes. In an embodiment, the data writing module transmits a same data voltage to the driving module in any one of the second working modes. In an embodiment, durations taken by the light-emitting control module to control the driving module to transmit a driving current to the light-emitting device in any one of the first working modes are the same. In an embodiment, durations taken by the light-emitting control module to control the driving module to transmit a driving current to the light-emitting device in at least two of the second working modes are different.

Another aspect of the present disclosure provides a display apparatus including a display panel. In an embodiment, the display panel includes light-emitting devices and pixel circuits. In an embodiment, an output terminal of one of the pixel circuits is electrically connected to at least one of the light-emitting devices. In an embodiment, one of the pixel circuits comprises a driving module, a data writing module, and a light-emitting control module. In an embodiment, both the data writing module and the light-emitting control module are electrically connected to the driving module. In an embodiment, one of the pixel circuits has first working modes and second working modes. In an embodiment, the data writing module transmits different data voltages to the driving module in at least two of the first working modes. In an embodiment, the data writing module transmits a same data voltage to the driving module in any one of the second working modes. In an embodiment, durations taken by the light-emitting control module to control the driving module to transmit a driving current to the light-emitting device in any one of the first working modes are the same. In an embodiment, durations taken by the light-emitting control module to control the driving module to transmit a driving current to the light-emitting device in at least two of the second working modes are different.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings.

DETAILED DESCRIPTION

In order to better understand technical solutions of the present disclosure, the embodiments of the present disclosure are described in detail with reference to the drawings.

It should be clear that the described embodiments are merely part of the embodiments of the present disclosure rather than all embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

In this specification, it should be understood that the terms such as "substantially", "approximate to", "approximately", "about", "roughly", and "generally" described in the claims and embodiments of the present disclosure mean general agreement within a reasonable process operation range or tolerance range, rather than an exact value.

It should be understood that although the terms 'first', 'second' and 'third' may be used in the present disclosure to describe transistors, these transistors should not be limited to these terms. These terms are used only to distinguish the transistors from each other. For example, without departing from the scope of the embodiments of the present disclosure, a first transistor may also be referred to as a second transistor. Similarly, the second transistor may also be referred to as the first transistor.

Figure 1:
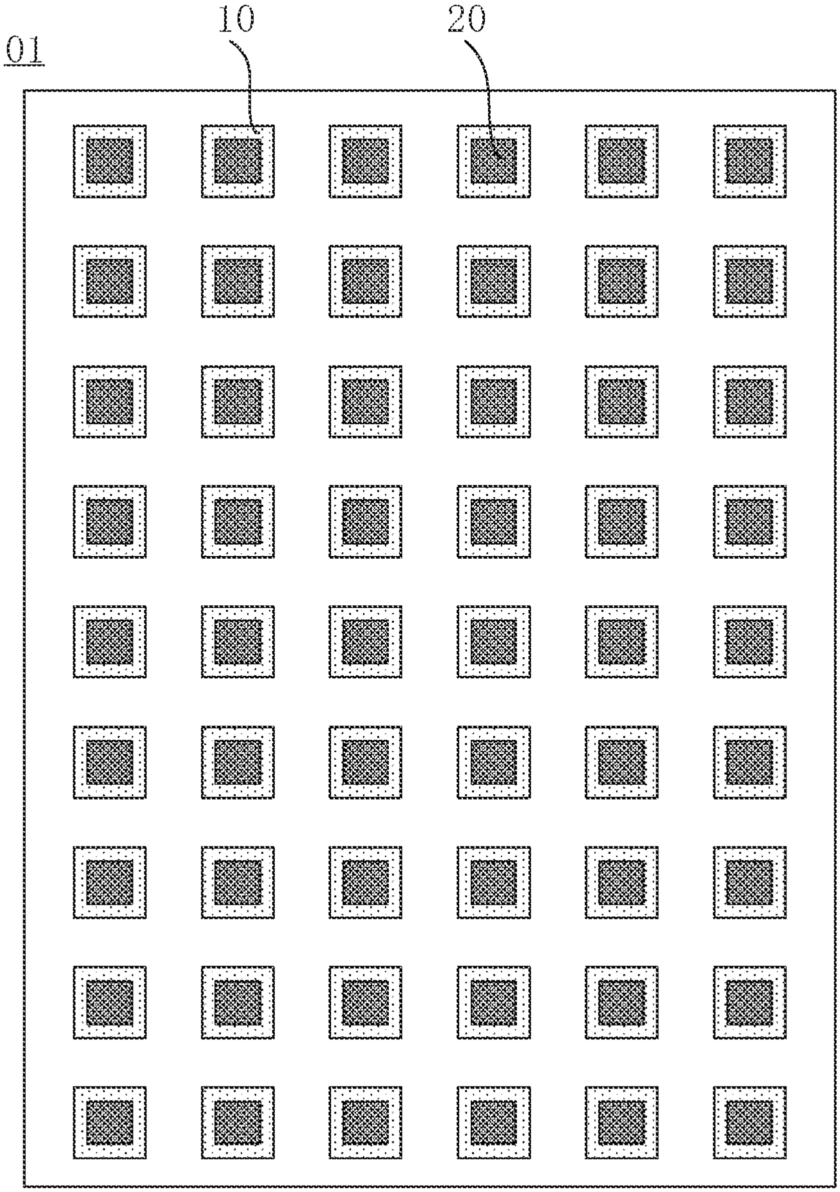
FIG. 1 is a schematic diagram of a display panel according to an embodiment of the present disclosure.

FIG. 1 is a schematic diagram of a display panel according to an embodiment of the present disclosure.

As shown in FIG. 1, a display panel 01 provided in the embodiments of the present disclosure includes pixel circuits 10 and light-emitting devices 20. An output terminal of one of the pixel circuits 10 is electrically connected to at least one of the light-emitting devices 20. The pixel circuit 10 can provide a driving current for the light-emitting device 20 to emit light.

For example, the light-emitting device 20 may be at least one of an organic light-emitting diode (OLED), a micro-light-emitting diode (micro-LED), and a mini-light-emitting diode (mini-LED).

In addition, the pixel circuits 10 in the display panel 01 may be electrically connected to the light-emitting devices 20 in one-to-one correspondence, or at least one of the pixel circuits 10 in the display panel 01 may be electrically connected to at least two light-emitting devices 20.

Figure 2:
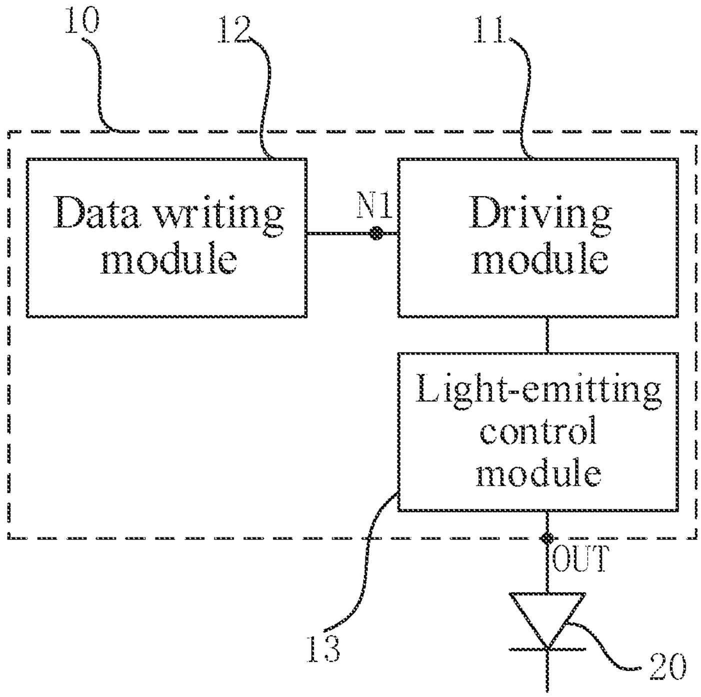
FIG. 2 is a schematic modular diagram of a pixel circuit in a display panel according to an embodiment of the present disclosure.

FIG. 2 is a schematic modular diagram of a pixel circuit in a display panel according to an embodiment of the present disclosure.

As shown in FIG. 2, the pixel circuit 10 includes a driving module 11, a data writing module 12, and a light-emitting control module 13. Both the data writing module 12 and the light-emitting control module 13 are electrically connected to the driving module 11. The driving module 11 serves as a main module for generating a driving current in the pixel circuit 10. The data writing module 12 serves as a main module for writing a data voltage into the driving module 11 in the pixel circuit 10. For example, the data writing module 12 writes the data voltage into a control terminal of the driving module 11. The light-emitting control module 13 serves as a main module for controlling the driving module 11 to generate the driving current and transmitting the driving current to the light-emitting device 20 in the pixel circuit 10.

Figure 3:
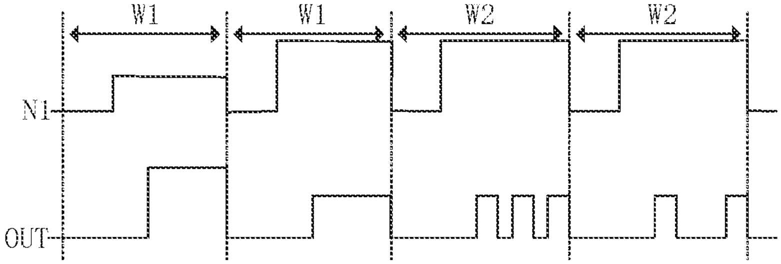
FIG. 3 illustrates a working time sequence of the pixel circuit shown in FIG. 2 according to an embodiment of the present disclosure.

FIG. 3 illustrates a working time sequence of the pixel circuit shown in FIG. 2.

In some embodiments of the present disclosure, as shown in FIG. 3, the pixel circuit 10 has first working mode W1 and second working mode W2. As shown in FIG. 2, a first node N1 is provided between the data writing module 12 and the driving module 11. A voltage of the first node N1 represents a voltage written by the data writing module 12 into the driving module 11. The light-emitting device 20 is electrically connected to the output terminal OUT of the pixel circuit 10. An effective voltage holding duration on the output terminal OUT of the pixel circuit 10 represents a duration taken by the light-emitting control module 13 to control the driving module 11 to transmit the driving current to the light-emitting device 20.

The data writing module 12 transmits different data voltages to the driving module 11 in at least two of the first working modes W1. Durations taken by the light-emitting control module 13 to control the driving module 11 to transmit a driving current to the light-emitting device 20 in any one of the first working modes W1 are the same.

Referring to FIG. 2 and FIG. 3, a voltage of the first node N1 in a first one of the first working modes W1 is different from a voltage of the first node in a second one of the first working modes W1. That is, a data voltage transmitted by the data writing module 12 to the driving module 11 in the first one of the first working modes W1 is different from a data voltage transmitted by the data writing module to the driving module 11 in the second one of the first working modes W1. The data writing module 12 transmits different data voltages to the driving module 11 at least in the first one of the first working modes W1 and the second one of the first working modes W1.

Referring to FIG. 2 and FIG. 3, the output terminal OUT of the pixel circuit 10 has a same effective level holding duration in the first one of the first working modes W1 and the second one of the first working modes W1. That is, in the first one of the first working modes W1 and the second one of the first working modes W1, durations taken by the light-emitting control module 13 to control the driving module 11 to transmit the driving current to the light-emitting device 20 are the same. Therefore, durations taken by the light-emitting control module 13 to control the driving module 11 to transmit the driving current to the light-emitting device 20 in any one of the first working modes W1 are the same. It should be noted that the duration taken by the light-emitting control module 13 to control the driving module 11 to transmit the driving current to the light-emitting device 20 may be determined by a turn-on duration of the light-emitting control module 13. For example, in response to a longer turn-on duration of the light-emitting control module 13, the duration taken by the driving module 11 to transmit the driving current to the light-emitting device 20 is longer. In response to a shorter turn-on duration of the light-emitting control module 13, the duration taken by the driving module 11 to transmit the driving current to the light-emitting device 20 is shorter.

The pixel circuit 10 is driven with Pulse Amplitude Modulation (PAM) in the first working mode W1. That is, in the first working mode W1, the pixel circuit 10 modulates a pulse amplitude of the data voltage written by the data writing module 12 into the driving module 11, thereby controlling the data voltage received by the driving module 11 in the first working mode W1. Thus, the driving module 11 can generate different driving currents in at least two different first working modes W1. Therefore, the pixel circuit 10 is driven with the PAM in the first working mode W1 to control brightness of the light-emitting device 20.

The data writing module 12 transmits a same data voltage to the driving module 11 in any one of the second working modes W2. In at least two of the second working modes W2, durations taken by the light-emitting control module 13 to control the driving module 11 to transmit the driving current to the light-emitting device 20 are different.

Referring to FIG. 2 and FIG. 3, a voltage of the first node N1 in a first one of the second working modes W2 is the same as a voltage of the first node in a second one of the second working modes W2. That is, a data voltage transmitted by the data writing module 12 to the driving module 11 in the first one of the second working modes W2 is the same as a data voltage transmitted by the data writing module to the driving module 11 in the second one of the second working modes W2. Therefore, the data writing module 12 transmits the same data voltage to the driving module 11 in any one of the second working modes W2.

Referring to FIG. 2 and FIG. 3, the output terminal OUT of the pixel circuit 10 has different effective level holding durations in the first one of the second working modes W2 and the second one of the second working modes W2. That is, in the first one of the second working modes W2 and the second one of the second working modes W2, durations taken by the light-emitting control module 13 to control the driving module 11 to transmit the driving current to the light-emitting device 20 are different. In at least the first one of the second working modes W2 and the second one of the second working modes W2, the durations taken by the light-emitting control module 13 to control the driving module 11 to transmit the driving current to the light-emitting device 20 are different.

The pixel circuit 10 is driven with PWM in the second working mode W2. That is, in the second working mode W2, the pixel circuit 10 modulates a pulse width of a signal output by the light-emitting control module 13 to turn on the driving module 11, thereby controlling a duration taken by the driving module 11 to output the driving current in the second working mode W2. Therefore, in at least two different second working modes W2, durations taken by the driving module 11 to transmit the driving current to the light-emitting device 20 are different. Therefore, the pixel circuit 10 is driven with the PWM in the second working mode W2 to control the brightness of the light-emitting device 20.

In some embodiments of the present disclosure, the pixel circuit 10 is driven with the PAM in the first working mode W1 to control the brightness of the light-emitting device 20, and driven with the PWM in the second working mode W2 to control the brightness of the light-emitting device 20. Therefore, the pixel circuit 10 can be driven more flexibly according to the brightness of the electrically connected light-emitting device 20.

When the pixel circuit 10 is driven with the PAM to control the brightness of the light-emitting device 20, the light-emitting device 20 can have a changeable brightness gradient, and the light-emitting device 20 achieves more grayscales corresponding to the changing brightness. When the brightness of the light-emitting device 20 needs to change in a certain brightness range, the PWM for driving the pixel circuit 10 electrically connected to the light-emitting device 20 can ensure an accuracy of the light-emitting device 20 in the brightness range. When the brightness of the light-emitting device 20 changes in this brightness range, the pixel circuit 10 electrically connected to the light-emitting device 20 may be in the second working mode W2.

Therefore, according to the display panel 01 provided by the embodiments of the present disclosure, the pixel circuit 10 is driven by combining PWM and PAM. On one hand, the light-emitting device 20 can have a changeable brightness gradient, so that more display grayscales of the display panel 01 are achieved. On the other hand, the light-emitting device 20 can change brightness at a higher accuracy, so that more accurate display grayscales of the display panel 01 are achieved.

When the pixel circuit 10 works in any mode of the first working mode W1 and the second working mode W2, a working phase includes a data voltage writing phase and a light-emitting phase. The data writing module 12 transmits a data voltage to the driving module 11 in the data voltage writing phase, and the light-emitting control module 13 controls the driving module 11 to transmit a driving current to the light-emitting device 20 in the light-emitting phase.

Figure 4:
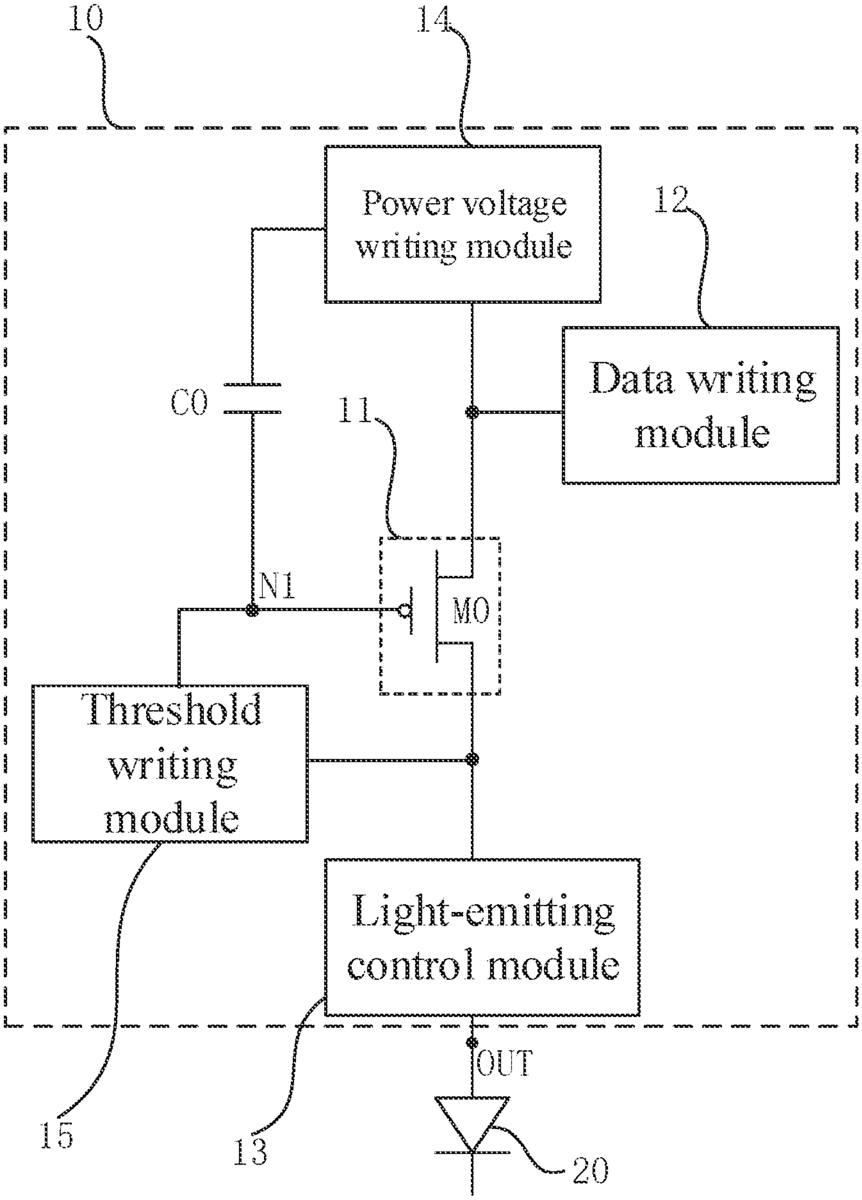
FIG. 4 is a schematic diagram of a pixel circuit in a display panel according to an embodiment of the present disclosure.

FIG. 4 is a schematic diagram of a pixel circuit in a display panel according to an embodiment of the present disclosure.

In an embodiment of the present disclosure, as shown in FIG. 4, the pixel circuit 10 may further include a power voltage writing module 14. The power voltage writing module 14 is electrically connected to the driving module 11 and configured to writing a power voltage PVDD into the driving module 11. The driving module 11 includes a driving transistor M0. The pixel circuit 10 may further include a storage capacitor CO. The storage capacitor CO is electrically connected to a gate of the driving transistor M0 and configured to maintain a potential on the gate of the driving transistor M0. In the light-emitting phase, a first terminal of the driving transistor M0 receives the power voltage PVDD transmitted by the power voltage writing module 14 to the driving module 11.

The gate of the driving transistor M0 receives, in the data voltage writing phase, a data voltage Vdata transmitted by the data writing module 12 to the driving module 11, and maintains, in the light-emitting phase, the voltage received in the data writing phase.

The pixel circuit 10 may further include a threshold writing module 15. The threshold writing module 15 includes an input terminal electrically connected to a second terminal of the driving transistor M0, and an output terminal electrically connected to the gate of the driving transistor M0. The data writing module 12 is electrically connected to the first terminal of the driving transistor M0. In the data writing phase, both the threshold writing module 15 and the data writing module 12 are turned on. The data voltage Vdata is written into the gate of the driving transistor M0 through the turn-on data writing module 12 and the turn-on threshold writing module 15.

In the light-emitting phase of the pixel circuit 10, the driving transistor M0 generates a driving current Id, $Id=K(PVDD-Vdata)^2$, K being a constant associated with the driving transistor M0. The driving current can reflect brightness of the light-emitting device 20 electrically connected to the pixel circuit 10.

As can be seen, the driving current generated by the driving transistor M0 is negatively associated with the data voltage in the embodiment. That is, the driving current generated by the pixel circuit 10 can be controlled by adjusting the data voltage. However, in response to a larger data voltage, namely a smaller driving current and a lower brightness of the light-emitting device 20, an accuracy for the brightness of the light-emitting device 20 is reduced by adjusting the data voltage. Therefore, when the brightness of the light-emitting device 20 electrically connected to the pixel circuit 10 needs to change in a range with a low brightness value, a duration taken by the light-emitting control module 13 to control the driving module 11 to transmit the driving current to the light-emitting device 20 can be controlled, thereby controlling the brightness of the light-emitting device 20, even though the pixel circuit 10 works in the second working mode W2.

For example, when the brightness of the light-emitting device 20 changes in brightness range corresponding to grayscales smaller than or equal to 32, the pixel circuit 10 may work in the second working mode W2. Alternatively, when the brightness of the light-emitting device 20 changes in brightness range corresponding to grayscales smaller than 32, the pixel circuit 10 may work in the second working mode W2. A corresponding grayscale of the display panel 01 when the pixel circuit 10 works in the second working mode W2 is smaller than a corresponding grayscale of the display panel 01 when the pixel circuit 10 works in the first working mode W1.

In an embodiment of the present disclosure, a driving current transmitted by the pixel circuit 10 to the light-emitting device 20 in the first working mode W1 is greater than or equal to a driving current transmitted by the pixel circuit 10 to the light-emitting device 20 in the second working mode W2. That is, a minimum driving current output by the pixel circuit 10 to the light-emitting device 20 in the first working mode W1 is greater than or equal to a maximum driving current output by the pixel circuit 10 to the light-emitting device 20 in the second working mode W2.

Referring to FIG. 2 and FIG. 3, an effective voltage on the output terminal OUT of the pixel circuit 10 represents the driving current transmitted by the driving module 11 to the light-emitting device 20 under the control of the light-emitting control module 13.

As shown in FIG. 2 and FIG. 3, driving currents transmitted by the pixel circuit 10 to the light-emitting device 20 in any second working mode W2 are the same, and the driving current transmitted by the pixel circuit 10 to the light-emitting device 20 in the second working mode W2 is the same as a minimum driving current in driving currents respectively transmitted by the pixel circuit 10 to the light-emitting device 20 in all first working modes W1. For example, as shown in FIG. 2, a driving current transmitted by the pixel circuit 10 to the light-emitting device 20 in the second one of the first working modes W1 is smaller than a driving current transmitted by the pixel circuit to the light-emitting device 20 in the first one of the first working modes W1. Meanwhile, the driving current transmitted by the pixel circuit 10 to the light-emitting device 20 in the second working mode W2 is the same as the driving current transmitted by the pixel circuit 10 to the light-emitting device 20 in the second one of the first working modes W1.

Figure 5:
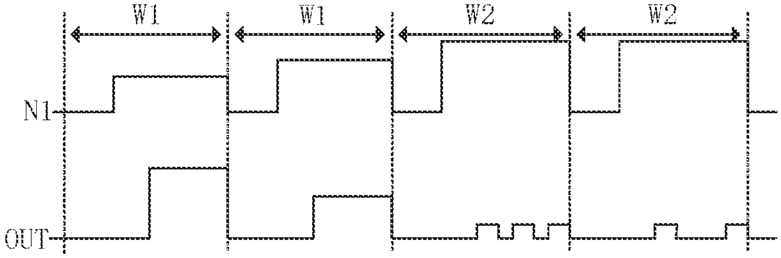
FIG. 5 illustrates another working time sequence of the pixel circuit shown in FIG. 2 according to an embodiment of the present disclosure.

FIG. 5 illustrates another working time sequence of the pixel circuit shown in FIG. 2.

As shown in FIG. 2 and FIG. 5, driving currents transmitted by the pixel circuit 10 to the light-emitting device 20 in any second working mode W2 are the same, and the driving current transmitted by the pixel circuit 10 to the light-emitting device 20 in the second working mode W2 is smaller than a minimum driving current in driving currents respectively transmitted by the pixel circuit 10 to the light-emitting device 20 in all first working modes W1. For example, as shown in FIG. 5, a driving current transmitted by the pixel circuit 10 to the light-emitting device 20 in the second one of the first working modes W1 is smaller than a driving current transmitted by the pixel circuit to the light-emitting device 20 in the first one of the first working modes W1. Meanwhile, the driving current transmitted by the pixel circuit 10 to the light-emitting device 20 in the second working mode W2 is smaller than the driving current transmitted by the pixel circuit 10 to the light-emitting device 20 in the second one of the first working modes W1.

In response to a determined duration taken by the pixel circuit 10 to transmit the driving current to the light-emitting device 20, the smaller the driving current transmitted by the pixel circuit 10 to the light-emitting device 20, the lower the brightness of the light-emitting device 20. In response to a determined driving current transmitted by the pixel circuit 10 to the light-emitting device 20, the shorter the duration taken by the pixel circuit 10 to transmit the driving current to the light-emitting device 20, the lower the brightness of the light-emitting device 20 perceived by human eyes. In some embodiments of the present disclosure, the brightness of the light-emitting device 20 electrically connected to the pixel circuit is controlled by controlling the driving current transmitted by the pixel circuit 10 to the light-emitting device 20 in the first working mode W1, and the brightness of the light-emitting device 20 electrically connected to the pixel circuit is controlled by controlling the duration taken by the pixel circuit 10 to transmit the driving current to the light-emitting device 20 in the second working mode W2. Therefore, even though the driving current transmitted by the pixel circuit 10 to the light-emitting device 20 in the second working mode W2 is the same as the driving current transmitted by the pixel circuit 10 to the light-emitting device 20 in the first working mode W1, by controlling the duration taken by the pixel circuit 10 to transmit the driving current to the light-emitting device 20 in the second working mode W2 to be shorter than the duration taken by the pixel circuit 10 to transmit the driving current to the light-emitting device 20 in the first working mode W1, a maximum brightness of the light-emitting device 20 in the second working mode W2 of the pixel circuit 10 is smaller than a minimum brightness of the light-emitting device 20 in any first working mode W1 of the pixel circuit 10.

In some embodiments of the present disclosure, a control terminal of the driving module 11 is configured to receive the data voltage output by the data writing module 12, and a minimum data voltage transmitted by the data writing module 12 to the driving module 11 in the first working mode W1 is smaller than or equal to the data voltage transmitted by the data writing module 11 to the driving module 12 in the second working mode W2. Therefore, the driving current transmitted by the pixel circuit 10 to the light-emitting device 20 in the first working mode W1 is greater than or equal to the driving current transmitted by the pixel circuit 10 to the light-emitting device 20 in the second working mode W2.

A manner that the control terminal of the driving module 11 is configured to receive the data voltage output by the data writing module 12 is as follows: the control terminal of the driving module 11 is directly and electrically connected to the data writing module 12, and the data voltage output by the data writing module 12 is directly written into the control terminal of the driving module 11. Another manner that the control terminal of the driving module 11 is configured to receive the data voltage output by the data writing module 12 is as follows. As shown in FIG. 4, the pixel circuit 10 includes the threshold writing module 15. The data voltage output by the data writing module 12 is written into the control terminal of the driving module 11 through the turn-on driving module 11 and the turn-on threshold writing module 15.

It should be noted that when the driving module 11 includes the driving transistor M0, the gate of the driving transistor M0 may be electrically connected to the control terminal of the driving module 11.

In some embodiments of the present disclosure, a duration taken by the light-emitting control module 13 to control the driving module 11 to transmit the driving current to the light-emitting device in the first working mode W1 20 is greater than a duration taken by the light-emitting control module 13 to control the driving module 11 to transmit the driving current to the light-emitting device 20 in the second working mode W2. That is, a maximum duration taken by the light-emitting control module 13 to control the driving module 11 to transmit the driving current to the light-emitting device 20 in the second working mode W2 is shorter than the duration taken by the light-emitting control module 13 to control the driving module 11 to transmit the driving current to the light-emitting device 20 in the second working mode W2. As shown in FIG. 3 and FIG. 5, a duration taken by the light-emitting control module 13 to control the driving module 11 to transmit the driving current to the light-emitting device 20 in any second working mode W2 is shorter than a duration taken by the light-emitting control module 13 to control the driving module 11 to transmit the driving current to the light-emitting device 20 in the first working mode W1.

Since the maximum driving current output by the pixel circuit 10 to the light-emitting device 20 in the second working mode W2 is smaller than or equal to the minimum driving current output by the pixel circuit 10 to the light-emitting device 20 in the first working mode W1, and durations taken by the pixel circuit 10 to transmit the driving current to the light-emitting device 20 in different second working modes W2 are shorter than the duration taken by the pixel circuit 10 to transmit the driving current to the light-emitting device 20 in the first working mode W1, the brightness of the light-emitting device 20 electrically connected to the pixel circuit 10 in the second working mode W2 is smaller than the brightness of the light-emitting device 20 electrically connected to the pixel circuit 10 in the first working mode W1. That is, in the embodiments of the present disclosure, when the brightness of the light-emitting device 20 changes in a low-brightness range, the pixel circuit 10 for driving the light-emitting device 20 can work in the second working mode W2.

Figure 6:
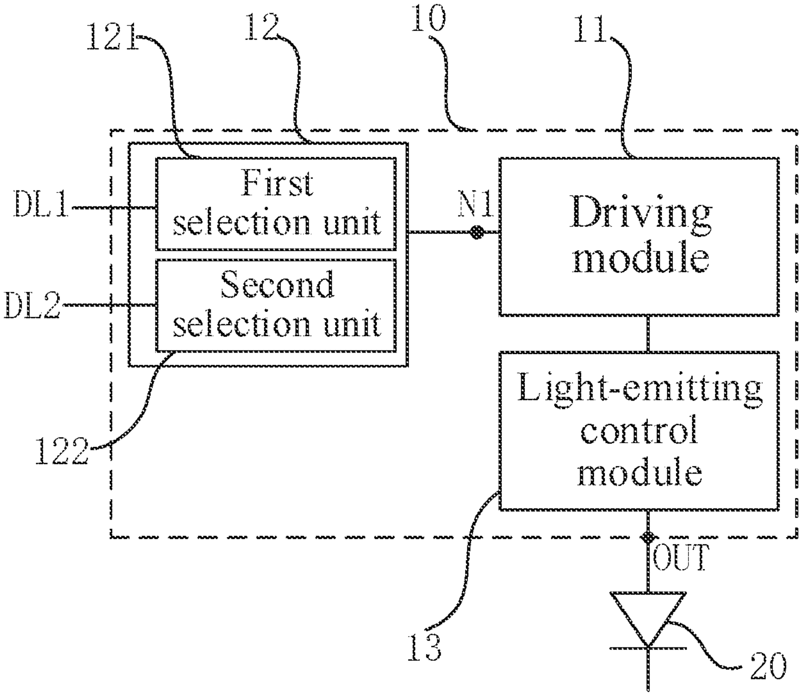
FIG. 6 is a schematic modular diagram of a pixel circuit in a display panel according to an embodiment of the present disclosure.

FIG. 6 is a schematic modular diagram of a pixel circuit in a display panel according to an embodiment of the present disclosure.

In an embodiment of the present disclosure, as shown in FIG. 6, the data writing module 12 includes a first selection unit 121 and a second selection unit 122. The first selection unit 121 is electrically connected to a first data line DL1, while the second selection unit 122 is electrically connected to a second data line DL2. In the first working mode W1 of the pixel circuit 10, the first selection unit 121 is turned on and the data writing module 12 transmits a data voltage on the first data line DL1 to the driving module 11. In the second working mode W2 of the pixel circuit 10, the second selection unit 122 is turned on and the data writing module 12 transmits a data voltage on the second data line DL2 to the driving module 11. That is, in the first working mode W1 of the pixel circuit 10, the driving module 11 acquires the data voltage on the first data line DL1 through the first selection unit 121 in the data writing module 12. In the second working mode W2 of the pixel circuit 10, the driving module 11 acquires the data voltage on the second data line DL2 through the second selection unit 122 in the data writing module 12.

In at least two of the first working modes W1 of the pixel circuit 10, data voltages transmitted by the first data line DL1 are different. Therefore, the data writing module 12 transmits different data voltages to the driving module 11 in the at least two first working modes W1. Data voltage transmitted by the second data line DL2 in any one of the second working modes W2 of the pixel circuit 10 are the same. Therefore, the data writing module 12 transmits the same data voltage to the driving module 11 in any second working mode W2.

The data voltage transmitted by the second data line DL2 may be smaller than or equal to a minimum data voltage transmitted by the first data line DL1.

In some embodiments of the present disclosure, the data voltage transmitted on the second data line DL2 can keep unchanged, which is not affected by switching of working modes of the pixel circuit 10. Therefore, when different pixel circuits 10 are driven with the PWM in the second working mode W2, data voltages respectively received by the driving modules 11 in these different pixel circuits 10 in the second working mode W2 are the same substantially. And/or, when the pixel circuit 10 is driven with the PWM in different second working modes W2, data voltages received by the pixel circuit 10 in these different second working modes W2 are the same substantially. By driving the different pixel circuits 10 in the second working mode W2 with the PWM, the light-emitting device 20 has a more accurate grayscale. By driving the pixel circuit 10 in the different second working modes W2 with the PWM, the light-emitting device 20 has a more accurate brightness.

Since the data voltage transmitted on the first data line DL1 is constantly changing, the pixel circuit 10 receives the data voltage on the second data line DL2 in the second working mode W2, rather than the data voltage on the first data line DL1. This prevents the data voltage on the data line from affecting the data voltages actually received by the driving modules 11 in the different pixel circuits 10 in the second working mode W2.

Figure 7:
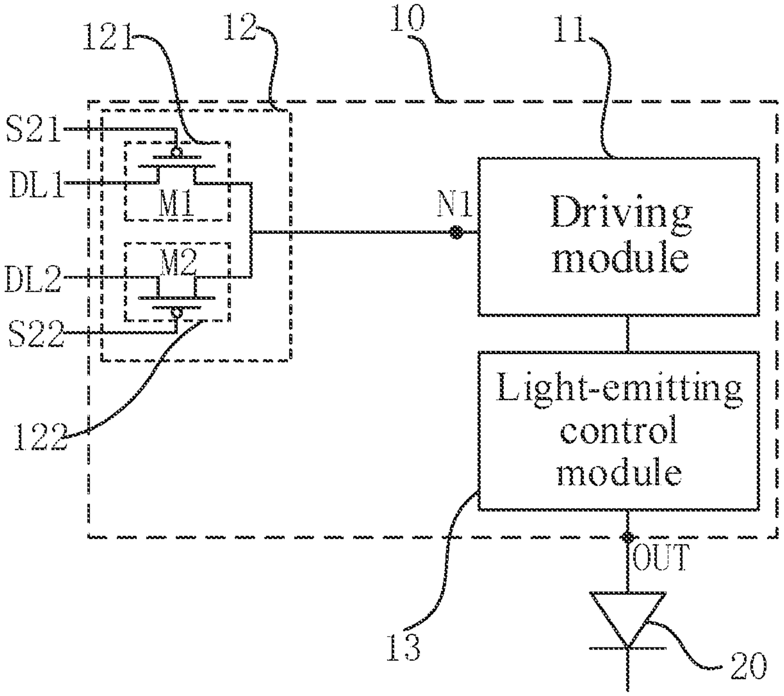
FIG. 7 is a schematic diagram of a pixel circuit in a display panel according to an embodiment of the present disclosure.

FIG. 7 is a schematic diagram of a pixel circuit in a display panel according to an embodiment of the present disclosure.

In an embodiment of the present disclosure, as shown in FIG. 7, the first selection unit 121 includes a first transistor M1. A first terminal of the first transistor M1 is electrically connected to the first data line DL1. In response to the first working mode W1 of the pixel circuit 10, the first transistor M1 is turned on to transmit the data voltage on the first data line DL1 to the driving module 11. The second selection unit 122 includes a second transistor M2. A first terminal of the second transistor M2 is electrically connected to the second data line DL2. In response to the second working mode W2 of the pixel circuit 10, the second transistor M2 is turned on to transmit the data voltage on the second data line DL2 to the driving module 11.

In some embodiments of the present disclosure, a channel type of the first transistor M1 may be the same as a channel type of the second transistor M2. In other implementations, the channel type of the first transistor M1 may also be different from the channel type of the second transistor M2.

Figure 8:
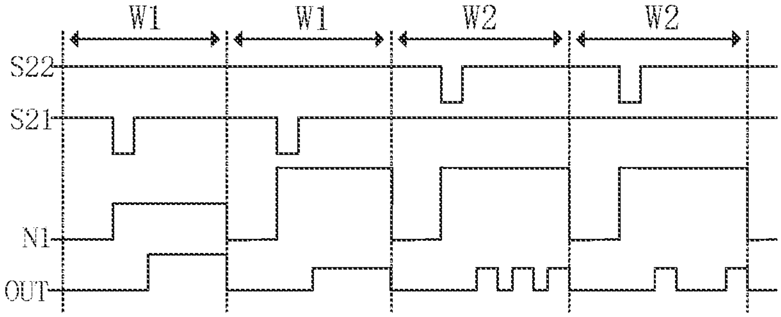
FIG. 8 illustrates a working time sequence of the pixel circuit shown in FIG. 7 according to an embodiment of the present disclosure.

FIG. 8 illustrates a working time sequence of the pixel circuit shown in FIG. 7.

In some embodiments of the present disclosure, as shown in FIG. 7, a gate of the first transistor M1 may be electrically connected to a first scanning line S21, and a gate of the second transistor M2 may be electrically connected to a second scanning line S22.

Referring to FIG. 7 and FIG. 8, in response to the first working mode W1 of the pixel circuit 10, the first scanning line S21 transmits an enable signal and the second scanning line S22 transmits a disable signal. The first transistor M1 is turned on to transmit the data voltage on the first data line DL1 to the driving module 11. For example, the control terminal (first node N1) of the driving module 11 receives the data voltage when the first transistor M1 is turned on.

Referring to FIG. 7 and FIG. 8, in response to the second working mode W2 of the pixel circuit 10, the first scanning line S21 transmits a disable signal and the second scanning line S22 transmits an enable signal. The second transistor M2 is turned on to transmit the data voltage on the second data line DL2 to the driving module 11. For example, the control terminal (first node N1) of the driving module 11 receives the data voltage when the second transistor M2 is turned on.

FIG. 7 and FIG. 8 are shown by taking an example in which the first transistor M1 and the second transistor M2 are a P-channel transistor. The enable signal transmitted by the first scanning line S21 and the second scanning line S22 is a low-level signal and the disable signal is a high-level signal. It should be noted that any one of the first transistor M1 and the second transistor M2 may also be an N-channel transistor. Corresponding to the N-channel transistor, the enable signal is a high-level signal and the disable signal is a low-level signal.

Figure 9:
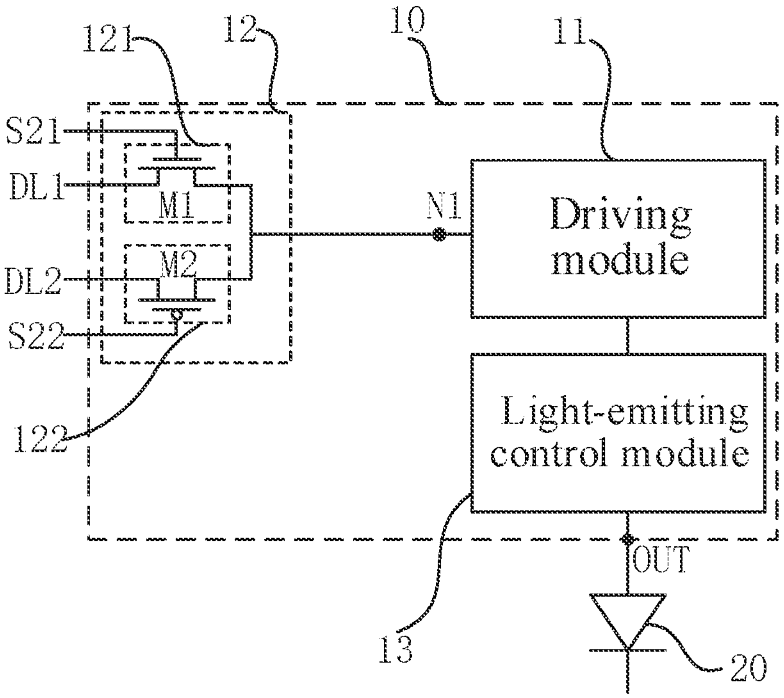
FIG. 9 is a schematic diagram of a pixel circuit in a display panel according to an embodiment of the present disclosure.

FIG. 9 is a schematic diagram of a pixel circuit in a display panel according to an embodiment of the present disclosure.

In some embodiments of the present disclosure, as shown in FIG. 9, the first transistor M1 may be an N-channel transistor, and the second transistor M2 may be a P-channel transistor.

When at least one of the transistors in the pixel circuit 10 uses a low-temperature polycrystalline silicon (LTPS) transistor, on the basis of a same width-to-length ratio, a carrier mobility of the N-channel transistor is greater than a carrier mobility of the P-channel transistor, and an equivalent resistance of the N-channel transistor is smaller than an equivalent resistance of the P-channel transistor. In a display process of the display panel 01, the display panel 01 is more applied to high-grayscale display than low-grayscale display. In other words, the pixel circuit 10 works in the first working mode W1 more than the second working mode W2. Thus, the first transistor M1 in the first selection unit 121 is turned on in most cases. By designing the first transistor M1 as the N-channel transistor, a display brightness of the display panel 01 can be closer to a preset value. In addition, in response to the high-grayscale display of the display panel 01, the data voltage transmitted on the first data line DL1 is relatively small. In this case, the N-channel transistor is configured to transmit the data voltage. This can ensure an accuracy of the data voltage to be written into the driving module 11.

In some embodiments of the present disclosure, as shown in FIG. 7 and FIG. 9, a second terminal of the first transistor M1 and a second terminal of the second transistor M2 are electrically connected to the driving module 11. When the first transistor M1 is turned on, a data voltage transmitted on the first data line DL1 can be directly transmitted to the driving module 11. When the second transistor M2 is turned on, a data voltage transmitted on the second data line DL2 can be directly transmitted to the driving module 11.

In some embodiments of the present disclosure, as shown in FIG. 7 and FIG. 9, the second terminal of the first transistor M1 and the second terminal of the second transistor M2 are electrically connected to the driving module 11. The gate of the first transistor M1 is electrically connected to the first scanning line S21, and the gate of the second transistor M2 is electrically connected to the second scanning line S22. When the first scanning line S21 transmits the enable signal, the first transistor M1 is turned on and the data voltage on the first data line DL1 is transmitted to the driving module 11. When the second scanning line S22 transmits the enable signal, the second transistor M2 is turned on and the data voltage on the second data line DL2 is transmitted to the driving module 11.

Figure 10:
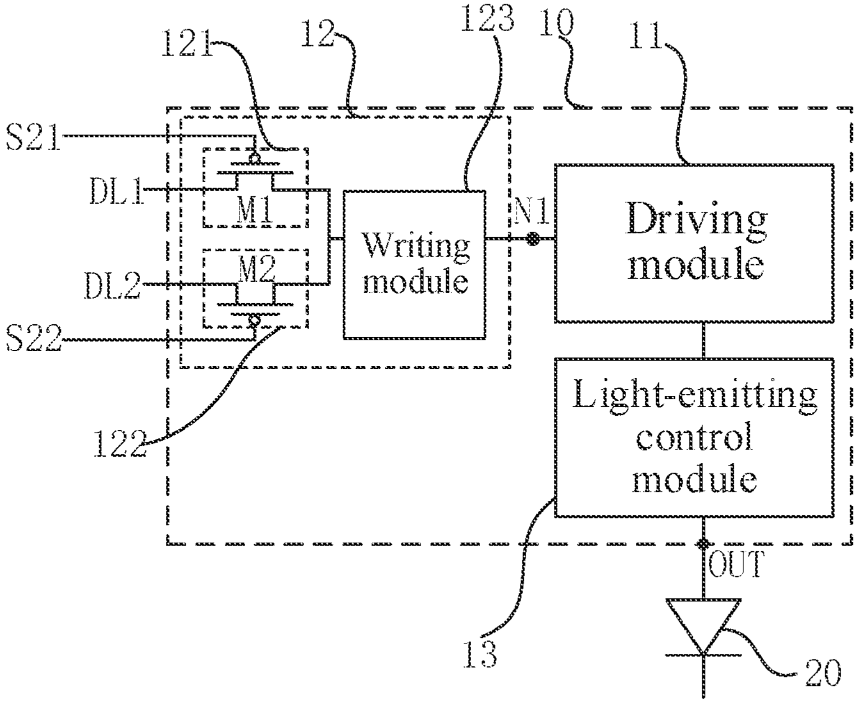
FIG. 10 is a schematic diagram of a pixel circuit in a display panel according to an embodiment of the present disclosure.

FIG. 10 is a schematic diagram of a pixel circuit in a display panel according to an embodiment of the present disclosure.

In some embodiments of the present disclosure, as shown in FIG. 10, the data writing module 12 further includes a writing module 123. An output terminal of the first selection unit 121 and an output terminal of the second selection unit 122 are electrically connected to an input terminal of the writing module 123. An output terminal of the writing module 123 is electrically connected to the driving module 11.

When the first selection unit 121 includes the first transistor M1 and the second selection unit 122 includes the second transistor M2, the second terminal of the first transistor M1 and the second terminal of the second transistor M2 are electrically connected to the input terminal of the writing module 123. The output terminal of the writing module 123 is electrically connected to the driving module 11. When the first transistor M1 and the writing module 123 are turned on, the data voltage transmitted on the first data line DL1 is written into the driving module 11. When the second transistor M2 and the writing module 123 are turned on, the data voltage transmitted on the second data line DL2 is written into the driving module 11.

Figure 11:
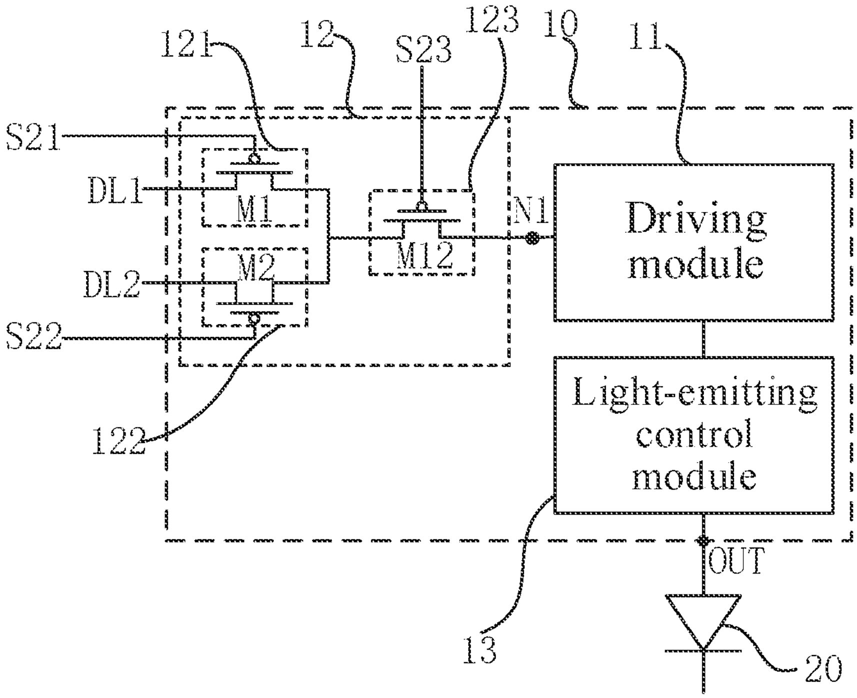
FIG. 11 is a schematic diagram of a pixel circuit in a display panel according to an embodiment of the present disclosure.
Figure 12:
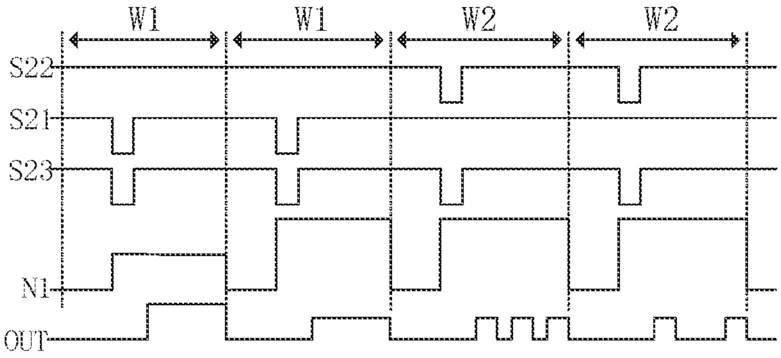
FIG. 12 illustrates a working time sequence of the pixel circuit shown in FIG. 11 according to an embodiment of the present disclosure.

FIG. 11 is a schematic diagram of a pixel circuit in a display panel according to an embodiment of the present disclosure. FIG. 12 illustrates a working time sequence of the pixel circuit shown in FIG. 11.

In the technical solution, as shown in FIG. 11, the writing module 123 may include a writing transistor M12. The second terminal of the first transistor M1 and the second terminal of the second transistor M2 are electrically connected to a first terminal of the writing transistor M12. A second terminal of the writing transistor M12 is electrically connected to the driving module 11. A gate of the writing transistor M12 may be electrically connected to a third scanning line S23. Referring to FIG. 11 and FIG. 12, the first scanning line S21 and the third scanning line S23 transmit an enable signal in the data writing phase of the first working mode W1, so that after the first transistor M1 and the writing transistor M12 are turned on, the data voltage on the first data line DL1 is written into the driving module 11. The second scanning line S22 and the third scanning line S23 transmit an enable signal in the data writing phase of the first working mode W1, so that after the second transistor M2 and the writing transistor M12 are turned on, the data voltage on the second data line DL2 is written into the driving module 11.

It should be noted that the writing transistor M12 is a P-channel transistor, and the enable signal transmitted by the third scanning line S23 is a low-level signal in FIG. 11. In addition, the writing transistor M12 may also be an N-channel transistor, and the enable signal transmitted by the third scanning line S23 is a high-level signal.

In some embodiments of the present disclosure, as shown in FIG. 10 and FIG. 11, the channel type of the first transistor M1 is the same as the channel type of the second transistor M2. The gate of the first transistor M1 and the gate of the second transistor M2 are respectively electrically connected to the first scanning line S21 and the second scanning line S22.

Figure 13:
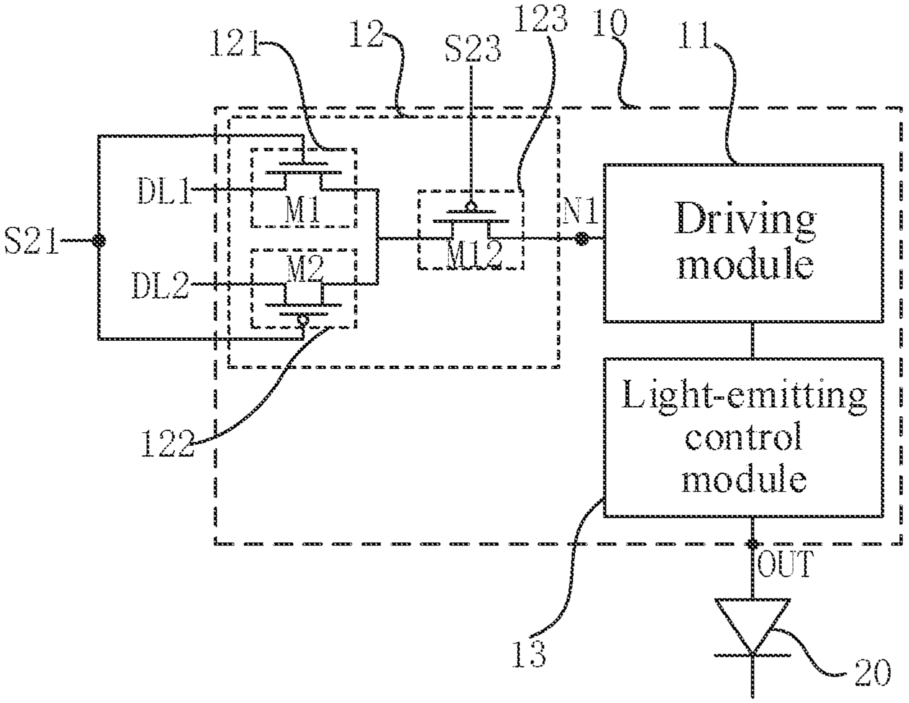
FIG. 13 is a schematic diagram of a pixel circuit in a display panel according to an embodiment of the present disclosure.

FIG. 13 is a schematic diagram of a pixel circuit in a display panel according to an embodiment of the present disclosure.

In some embodiments of the present disclosure, as shown in FIG. 13, the channel type of the first transistor M1 is different the channel type of the second transistor M2. The gate of the first transistor M1 and the gate of the second transistor M2 are connected to the same scanning line S21. When the first transistor M1 is turned on, the second transistor M2 is turned off. When the second transistor M2 is turned on, the first transistor M1 is turned off. That is, when the first selection unit 121 is turned on, the second selection unit 122 is turned off. When the second selection unit 122 is turned on, the first selection unit 121 is turned off.

Figure 14:
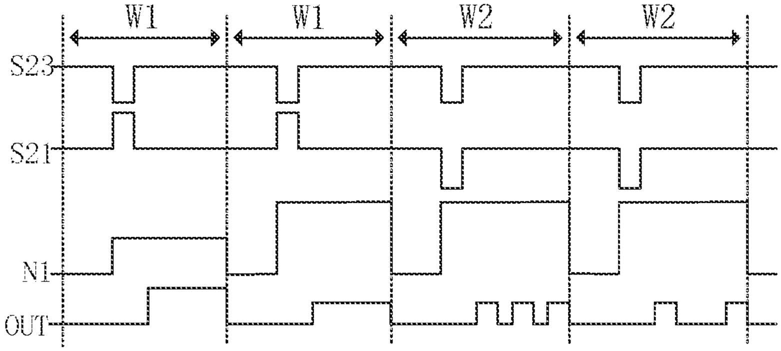
FIG. 14 illustrates a working time sequence of the pixel circuit shown in FIG. 13 according to an embodiment of the present disclosure.

FIG. 14 illustrates a working time sequence of the pixel circuit shown in FIG. 13.

For example, the writing module 123 includes the writing transistor M12, the writing transistor M12 is a P-channel transistor, the first transistor M1 is an N-channel transistor and the second transistor M2 is the P-channel transistor. Referring to FIG. 13 and FIG. 14, since the gate of the first transistor M1 and the gate of the second transistor M2 are electrically connected to the same scanning line S21 in the embodiments of the present disclosure, in response to the first display model W1 of the pixel circuit 10, the first selection unit 121 can also be turned on in a phase other than the data writing phase. However, due to the writing module, a data voltage can still only be written into the driving module 11 in the data writing phase of the first display model W1. Since the gate of the first transistor M1 and the gate of the second transistor M2 are electrically connected to the same scanning line S21 in the embodiments of the present disclosure, in response to the second display model W2 of the pixel circuit 10, the second selection unit 122 can also be turned on in a phase other than the data writing phase. However, due to the writing module 123, a data voltage can still only be written into the driving module 11 in the data writing phase of the second display model W2. Meanwhile, a number of scanning lines in the display panel 01 can be substantially reduced in the embodiments of the present disclosure.

Optionally, the first transistor M1 is an N-channel transistor, and the second transistor M2 is a P-channel transistor. The gate of the first transistor M1 and the gate of the second transistor M2 are electrically connected to the same scanning line S21. Therefore, a number of scanning lines in the display panel 01 can be substantially reduced, and the display panel 01 has a higher display grayscale accuracy.

Figure 15:
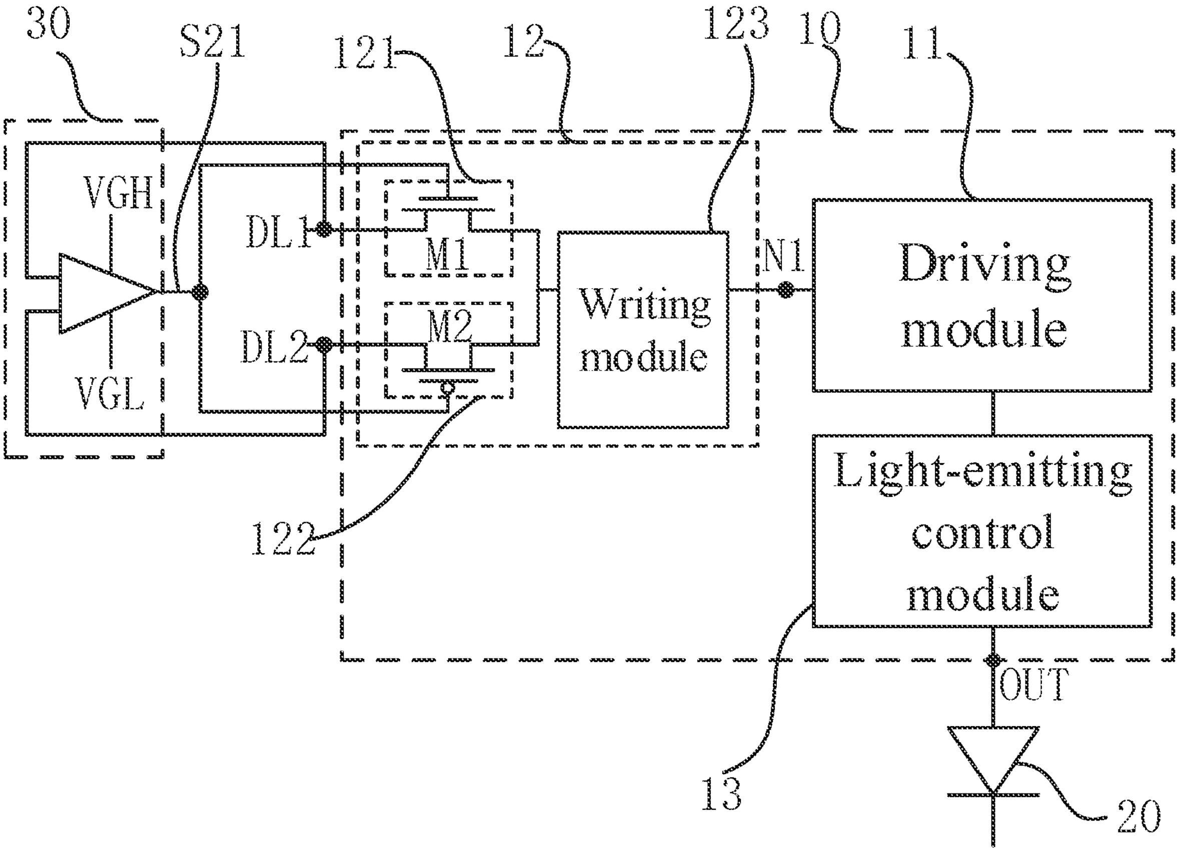
FIG. 15 is a schematic diagram of a pixel circuit in a display panel according to an embodiment of the present disclosure.

FIG. 15 is a schematic diagram of a pixel circuit in a display panel according to an embodiment of the present disclosure.

In an embodiment of the present disclosure, as shown in FIG. 15, the display panel further includes a comparator module 30. The gate of the first transistor M1 and the gate of the second transistor M2 are connected to the first scanning line S21. The first scanning line S21 is electrically connected to an output terminal of the comparator module 30. The comparator module 30 transmits a first enable signal or a second enable signal to the first scanning line S21. The signal output by the comparator module 30 is determined by a signal transmitted by the first scanning line S21, thereby turning on the first transistor M1 or the second transistor M2. That is, based on time division, the comparator module 30 outputs the first enable signal to turn on the first transistor M1 and turn off the second transistor M2, and the second enable signal to turn off the first transistor M1 and turn on the second transistor. For example, the first transistor M1 is an N-channel transistor and the second transistor M2 is a P-channel transistor. When the comparator module 30 outputs the first enable signal (high-level signal), the first transistor M1 is turned on and the second transistor M2 is turned off. When the comparator module 30 outputs the second enable signal (low-level signal), the first transistor M1 is turned off and the second transistor M2 is turned on.

Referring also to FIG. 15, two input terminals of the comparator module 30 are respectively electrically connected to the first data line DL1 and the second data line DL2. Whether the comparator module 30 outputs the first enable signal or the second enable signal depends on a signal transmitted by the first data line DL1 and a signal transmitted by the second data line DL2. That is, the comparator module 30 transmits the first enable signal or the second enable signal to the first scanning line S21 according to the data voltage transmitted on the first data line DL1 and the data voltage transmitted on the second data line DL2.

It is to be understood that a same data voltage is transmitted on the second data line DL2, and the second data line DL2 can be electrically connected to a reference voltage input terminal of the comparator module 30.

For example, a maximum data voltage transmitted by the data writing module 12 to the driving module 11 in the first working mode W1 is smaller than a data voltage transmitted by the data writing module 12 to the driving module 11 in the second working mode W2. When the data voltage transmitted on the first data line DL1 is greater than the data voltage transmitted on the second data line DL2, the second transistor M2 is turned on, and the pixel circuit 10 works in the second working mode W2. In this case, the comparator module 30 outputs the second enable signal. When the data voltage transmitted on the first data line DL1 is smaller than the data voltage transmitted on the second data line DL2, the first transistor M1 is turned on, and the pixel circuit 10 works in the first working mode W1. In this case, the comparator module 30 outputs the first enable signal.

That is, when the minimum data voltage transmitted by the data writing module 12 to the driving module 11 in the first working mode W1 is smaller than the data voltage transmitted by the data writing module 12 to the driving module 11 in the second working mode W2, if the data voltage transmitted on the first data line DL1 is greater than the data voltage transmitted on the second data line DL2, the comparator module 30 outputs the second enable signal, and, if the data voltage transmitted on the first data line DL1 is smaller than the data voltage transmitted on the second data line DL2, the comparator module 30 outputs the first enable signal.

When the display panel includes the comparator module 30, the display panel 01 can flexibly control whether the pixel circuit 10 works in the first working mode W1 or the second working mode W2 through the comparator module 30.

Figure 16:
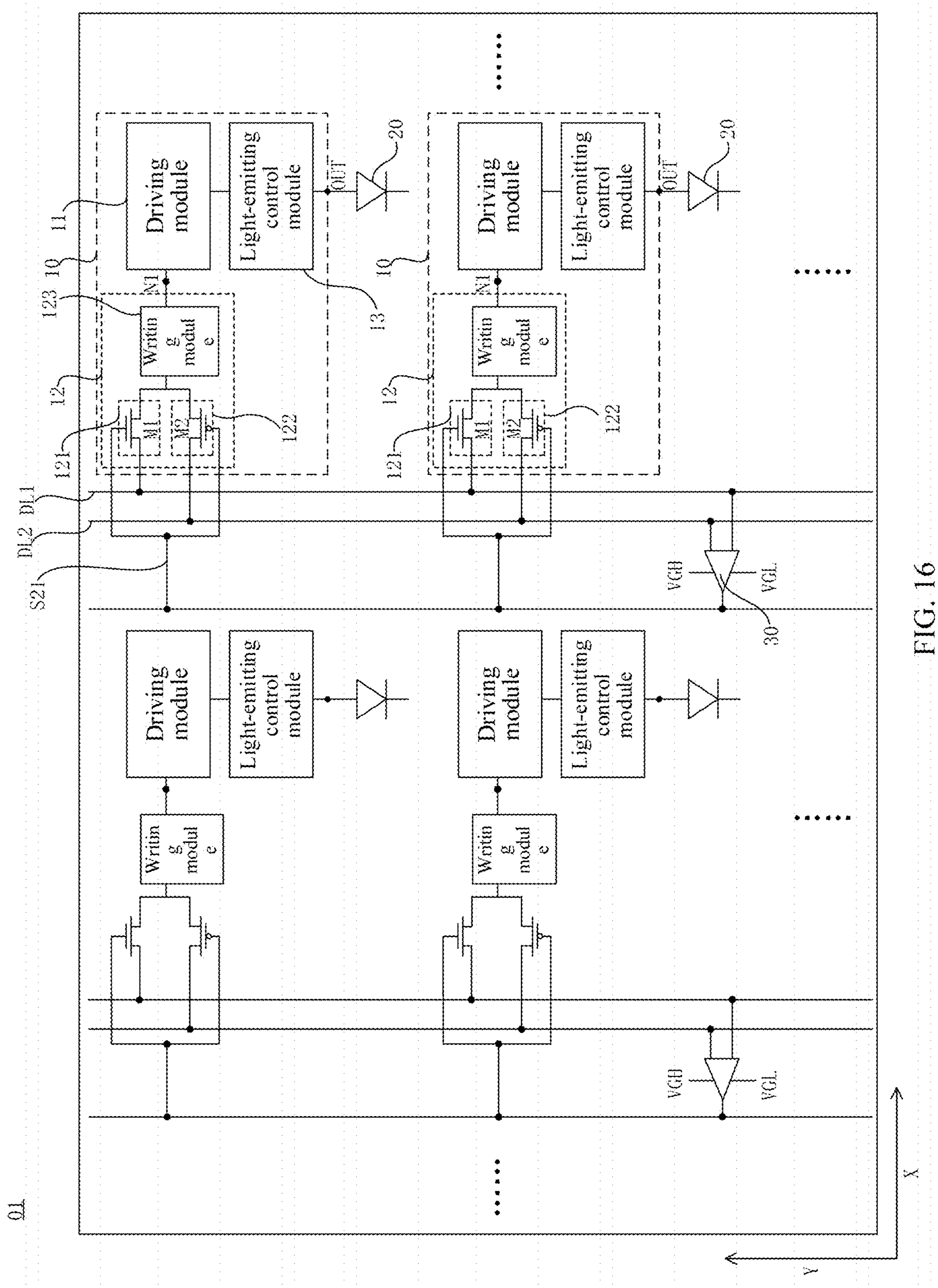
FIG. 16 is a schematic diagram of a display panel according to an embodiment of the present disclosure.

FIG. 16 is a schematic diagram of a display panel according to an embodiment of the present disclosure.

In some embodiments of the present disclosure, the first data line DL1 is electrically connected to at least two of the pixel circuits 10. At least two pixel circuits 10 electrically connected to the same first data line DL1 are electrically connected to a same one of the comparator modules 30.

For example, as shown in FIG. 16, the first data lines DL1 extend along a first direction Y. At least two of the pixel circuits 10 arranged along the first direction Y are connected to the same first data line DL1. The at least two pixel circuits arranged along the first direction and electrically connected to the same first data line DL1 may be electrically connected to the same comparator module 30.

In the technical solution, with a small number of the comparator modules 30, a number of the scanning lines electrically connected to the gate of the first transistor M1 and the gate of the second transistor M2 can be reduced. Meanwhile, two pixel circuits electrically connected to the same first data line DL1 and the pixel circuits electrically connected to the same comparator module 30 are electrically connected to the same first data line DL1 and work in cooperation with the writing module 123. This can still ensure a normal working time sequence of the pixel circuits 10 arranged along the first direction Y.

In some embodiments of the present disclosure, the first data lines DL1 are electrically connected to the comparator modules 30 in one-to-one correspondence, and the second data lines DL2 are electrically connected to the comparator modules 30 in one-to-one correspondence. As shown in FIG. 16, the first data lines DL1 are arranged along a second direction X, and the second data lines DL2 are arranged along the second direction X. The first data lines DL1 are respectively electrically connected to the comparator modules 30. The second data lines DL2 are respectively electrically connected to the comparator modules 30.

Figure 17:
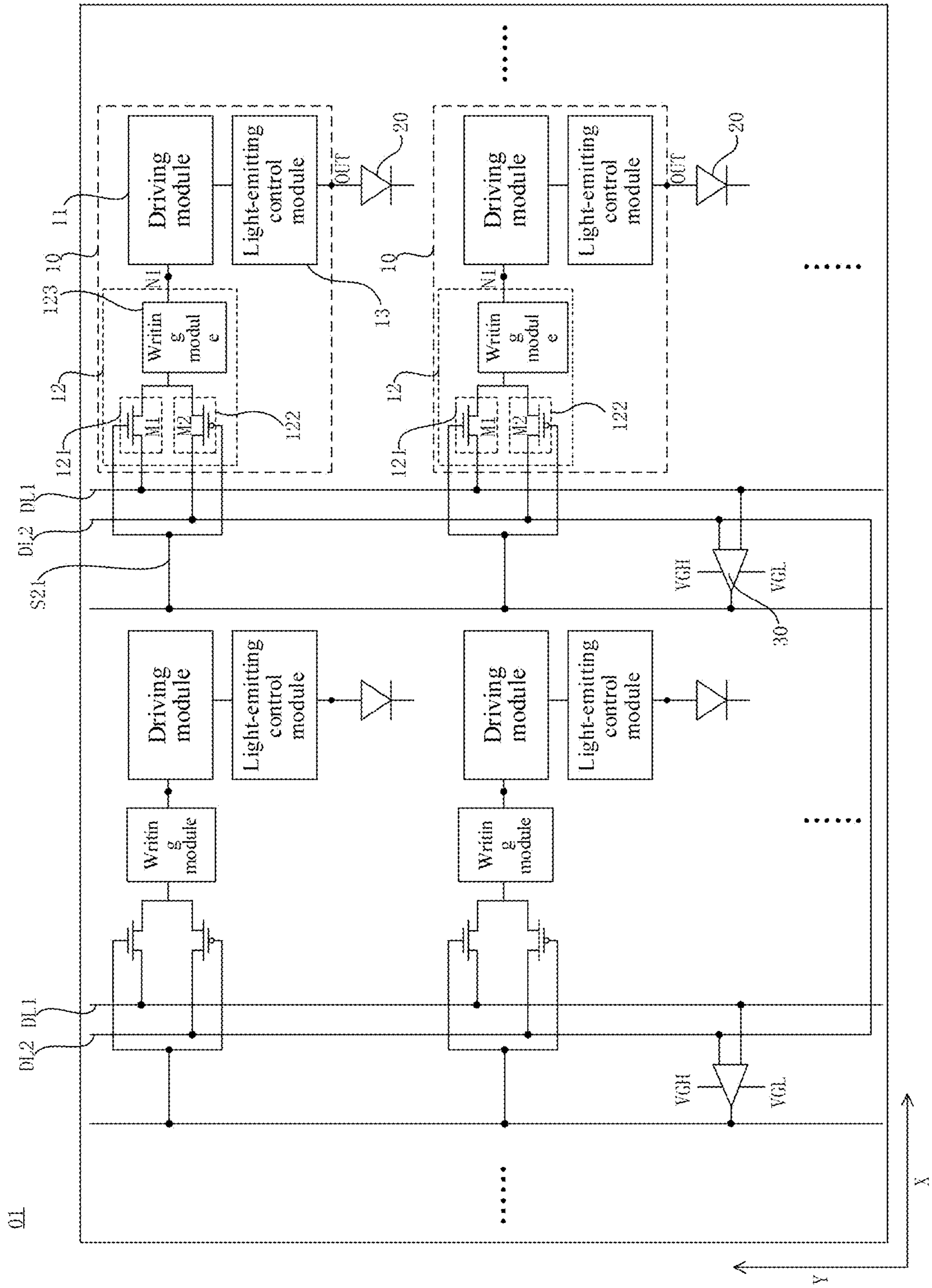
FIG. 17 is a schematic diagram of a display panel according to an embodiment of the present disclosure.

FIG. 17 is a schematic diagram of a display panel according to an embodiment of the present disclosure.

In some embodiments of the present disclosure, at least two second data lines DL2 are electrically connected. As shown in FIG. 17, the second data lines DL2 are arranged along the second direction X, and at least two second data lines DL2 arranged along the second direction X are electrically connected. The comparator module 30 may be electrically connected to the pixel circuits 10 respectively electrically connected to the at least two second data lines DL2 that are electrically connected together. The comparator module 30 may be electrically connected to one first data line DL1. The second data lines DL2 serves as not only signal lines that provide a data voltage for different second data lines DL2, but also signal lines that provide a reference voltage for the comparator modules 30.

As shown in FIG. 17, the first data line DL1 may be electrically connected to pixel circuits 10. In some embodiments of the present disclosure, the first data line DL1 is electrically connected to the first selection units 121 in the data writing modules 12 of the pixel circuits 10. The second data line DL2 may be electrically connected to pixel circuits 10, and specifically electrically connected to the second selection units 122 in the data writing modules 12 of the pixel circuits 10. A number of the pixel circuits 10 electrically connected to the first data line DL1 is smaller than a number of the pixel circuits 10 electrically connected to the second data line DL2. For example, as shown in FIG. 17, the first data line DL1 is electrically connected to one column of pixel circuits 10, and the second data line DL2 is electrically connected to at least two column of pixel circuits 10.

Therefore, any different pixel circuits 10 electrically connected to the same second data line DL2 can receive a data voltage on the same second data line DL2 in the second working mode W2. Data voltages received by these different pixel circuits 10 in the second working mode W2 are the same. With the PWM driving, the brightness of the light-emitting device 20 is more accurate. Meanwhile, this embodiment can avoid an excessively increased number of the second data lines DL2.

Figure 18:
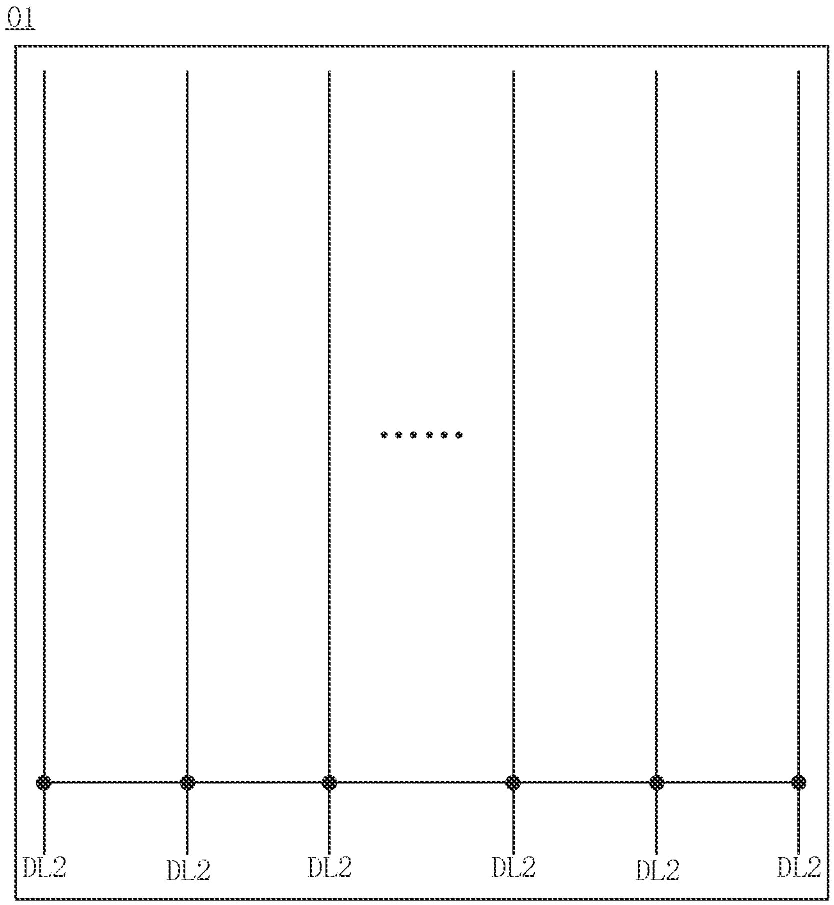
FIG. 18 is a schematic diagram of a second data line in a display panel according to an embodiment of the present disclosure.

FIG. 18 is a schematic diagram of a second data line in a display panel according to an embodiment of the present disclosure.

In some embodiments of the present disclosure, as shown in FIG. 18, all second data lines DL2 are electrically connected. This can effectively reduce a number of ports providing a data voltage signal for the second data line DL2 in a driving chip, and can reduce a number of pads electrically connected to the second data line DL2 on the display panel 01, thereby avoiding design difficultly of the driving chip and a binding region of the display panel due to increasing number of the second data line DL2.

In a corresponding solution, the second data line DL2 is electrically connected to all pixel circuits 10. Thus, any different pixel circuits 10 can receive a data voltage on the second data line DL2 in the second working mode W2. Data voltages received by the pixel circuits 10 in the second working mode W2 are the same. With the PWM driving, the brightness of the light-emitting device 20 is more accurate.

Figure 19:
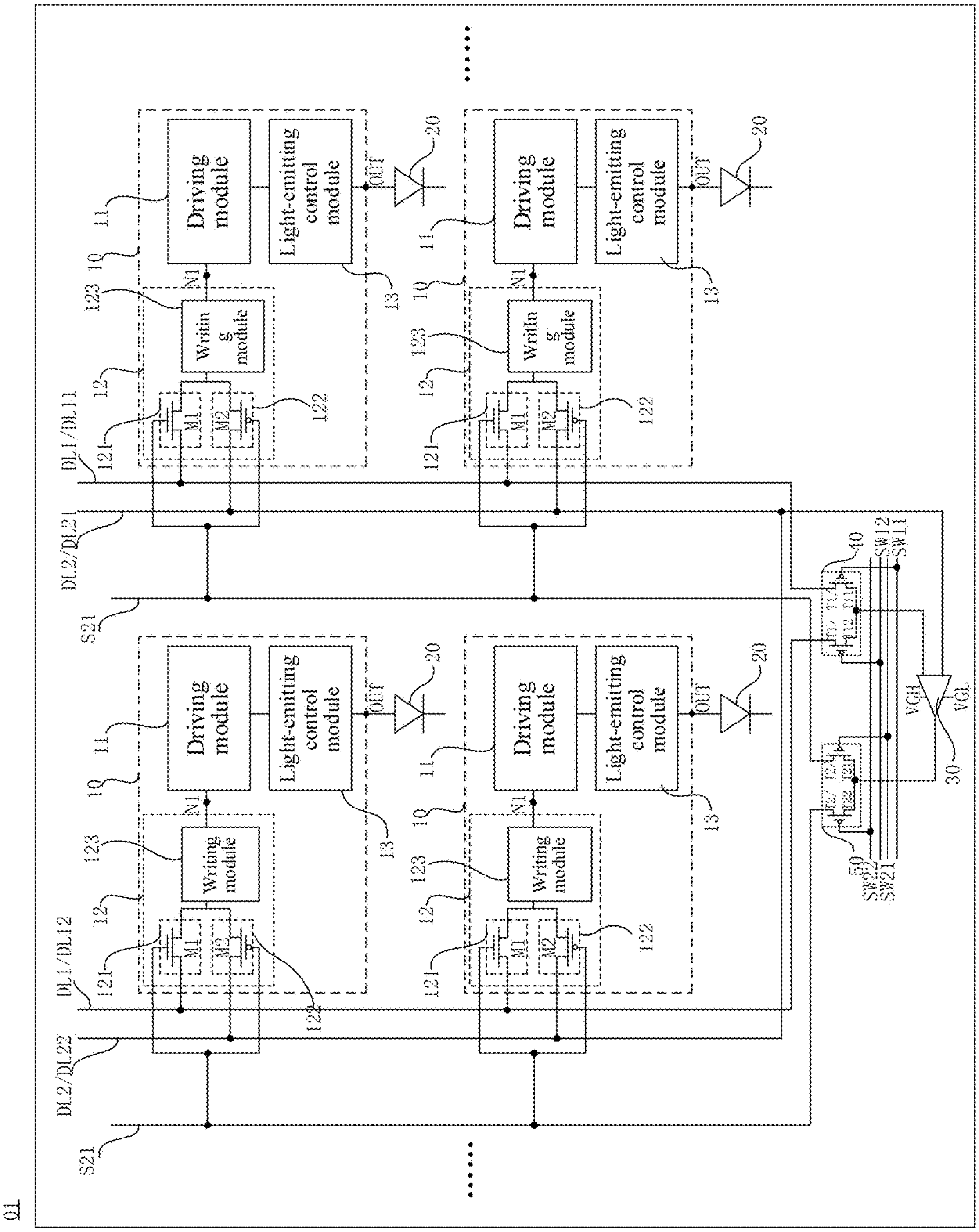
FIG. 19 is a schematic diagram of a display panel according to an embodiment of the present disclosure.

FIG. 19 is a schematic diagram of a display panel according to an embodiment of the present disclosure.

In an embodiment of the present disclosure, the display panel 01 further includes a first multiplexing circuit 40 and a second multiplexing circuit 50. As shown in FIG. 19, when the gate of the first transistor M1 and the gate of the second transistor M2 in the same data writing module 12 are connected to a same scanning line (e.g., the first scanning line S21), the first multiplexing circuit 40 includes at least two first switches T1 respectively electrically connected to different first data lines DL1, and the second multiplexing circuit 50 includes at least two second switches T2 respectively electrically connected to different first scanning lines S21. The first multiplexing circuit 40 is electrically connected to at least two first data lines DL1 and transmits a data voltage to different first data lines DL1 in time division. The second multiplexing circuit 50 is electrically connected to at least two first scanning lines S21 and transmits a signal to the first scanning lines S21 in time division.

In some embodiments of the present disclosure, the display panel 01 further includes the comparator module 30. The two input terminals of the comparator module 30 are respectively electrically connected to an output terminal of the first multiplexing circuit 40 and the second data line DL2. When one first switch T1 of the first multiplexing circuit 40 is turned on, the first data line DL1 electrically connected to the first switch T1 is electrically connected to the input terminal of the comparator module 30. In this case, the comparator module 30 includes one input terminal electrically connected to the first data line DL1, and the other input terminal electrically connected to the second data line DL2.

In addition, an output terminal of the comparator module 30 is electrically connected to an input terminal of the second multiplexing circuit 50. The first switch T1 and the second switch T2 respectively electrically connected to the first data line DL1 and the first scanning line S21 that are electrically connected to the same pixel circuit 10 are turned on at the same time. According to a signal on the first data line DL1 electrically connected to the input terminal of the comparator module, the comparator module 30 can output a signal to turn on the first transistor M1 or the second transistor M2 in the pixel circuit 10 electrically connected to the first data line DL1.

Figure 20:
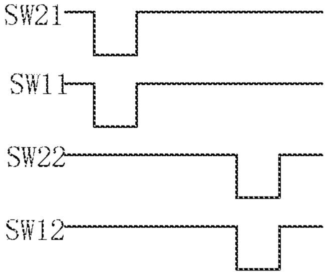
FIG. 20 illustrates a working time sequence of the display panel shown in FIG. 19 according to an embodiment of the present disclosure.

FIG. 20 illustrates a working time sequence of the display panel shown in FIG. 19. The embodiments of the present disclosure is described with reference to FIG. 19 and FIG. 20.

As shown in FIG. 19, the first multiplexing circuit 40 in the display panel 01 includes two first switches T11 and T12. An input terminal of the first switch T11 and an input terminal of the first switch T12 are respectively electrically connected to different first data lines DL1. An output terminal of the first switch T11 and an output terminal of the first switch T12 are electrically connected to one input terminal of the same comparator module 30. For example, the first switch T11 includes a control terminal electrically connected to a first switch control line SW11, the input terminal electrically connected to the first data line DL11, and the output terminal electrically connected to one input terminal of the comparator module 30. The first switch T12 includes a control terminal electrically connected to a first switch control line SW12, the input terminal electrically connected to the first data line DL12, and the output terminal electrically connected to one input terminal of the comparator module 30.

As shown in FIG. 19, the second multiplexing circuit 50 in the display panel 01 includes two second switches T21 and T22. An output terminal of the second switch T21 and an output terminal of the second switch T22 are respectively electrically connected to different first scanning lines S21. An input terminal of the second switch T21 and an input terminal of the second switch T22 are electrically connected to the output terminal of the same comparator module 30. For example, the second switch T21 includes a control terminal electrically connected to a second switch control line SW21, the input terminal electrically connected to the output terminal of the comparator module 30, and the output terminal electrically connected to one first scanning line S21. The second switch T22 includes a control terminal electrically connected to a second switch control line SW22, the input terminal electrically connected to the output terminal of the comparator module 30, and the output terminal electrically connected to the other first scanning line S21.

The pixel circuits 10 electrically connected to first scanning line S21 and the first data line DL11 are the same, and the pixel circuits 10 electrically connected to first scanning line S21 and the first data line DL12 are the same. For example, both the first switch T11/T12 and the second switch T21/T22 are a P-channel transistor.

Referring to FIG. 19 and FIG. 20, when the first switch control line SW11 and the second switch control line SW21 transmit an enable signal (low-level signal), the first switch T11 and the second switch T21 are turned on. In this case, the first data line DL11 and the first scanning line S21 are respectively electrically connected to the comparator module 30 through the first switch T11 and the second switch T21. The comparator module 30 outputs a signal to turn on the first transistor M1 or the second transistor M2 in the pixel circuit 10 electrically connected to the first scanning line S21 and the first data line DL11.

It should be noted that although the first scanning line S21 and the first data line DL11 are connected to pixel circuits 10, a writing error of the data voltage can be prevented with the writing module 123. For example, the first data line DL11 transmits a data voltage required by the top right pixel circuit 10 in FIG. 19. The pixel circuit 10 and the bottom right pixel circuit 10 are electrically connected to the same first data line DL11, the same second data line DL2 and the same first scanning line S21. However, the writing module 123 of the top right pixel circuit 10 is turned on, while the writing module 123 of the bottom right pixel circuit 10 is not turned on. The data voltage transmitted by the first data line DL11 is only written into the top right pixel circuit 10.

Referring to FIG. 19 and FIG. 20, when the first switch control line SW12 and the second switch control line SW22 transmit an enable signal (low-level signal), the first switch T12 and the second switch T22 are turned on. In this case, the first data line DL12 and the first scanning line S21 are respectively electrically connected to the comparator module 30 through the first switch T12 and the second switch T22. The comparator module 30 outputs a signal to turn on the first transistor M1 or the second transistor M2 in the pixel circuit 10 electrically connected to the first scanning line S21 and the first data line DL12.

It should be noted that although the first scanning line S21 and the first data line DL12 are connected to pixel circuits 10, a writing error of the data voltage can be prevented with the writing module 123.

In some embodiments of the present disclosure, the first data line DL1 is electrically connected to the comparator module 30 through the first multiplexing circuit 40, and the first scanning line S21 is electrically connected to the comparator module 30 through the second multiplexing circuit 50. This does not increase the comparator module 30 excessively.

In some embodiments of the present disclosure, as shown in FIG. 19, in the first switch T1 and the second switch T2 respectively electrically connected to the first data line DL1 and the first scanning line S21 that are electrically connected to a same one of the pixel circuits 10, a control terminal of the first switch T1 and a control terminal of the second switch T2 are electrically connected to different scanning lines. For example, the first switch T11 and the second switch T21 are respectively electrically connected to the first switch control line SW11 and the second switch control line SW21. The first switch T12 and the second switch T22 are respectively electrically connected to the first switch control line SW12 and the second switch control line SW22.

Figure 21:
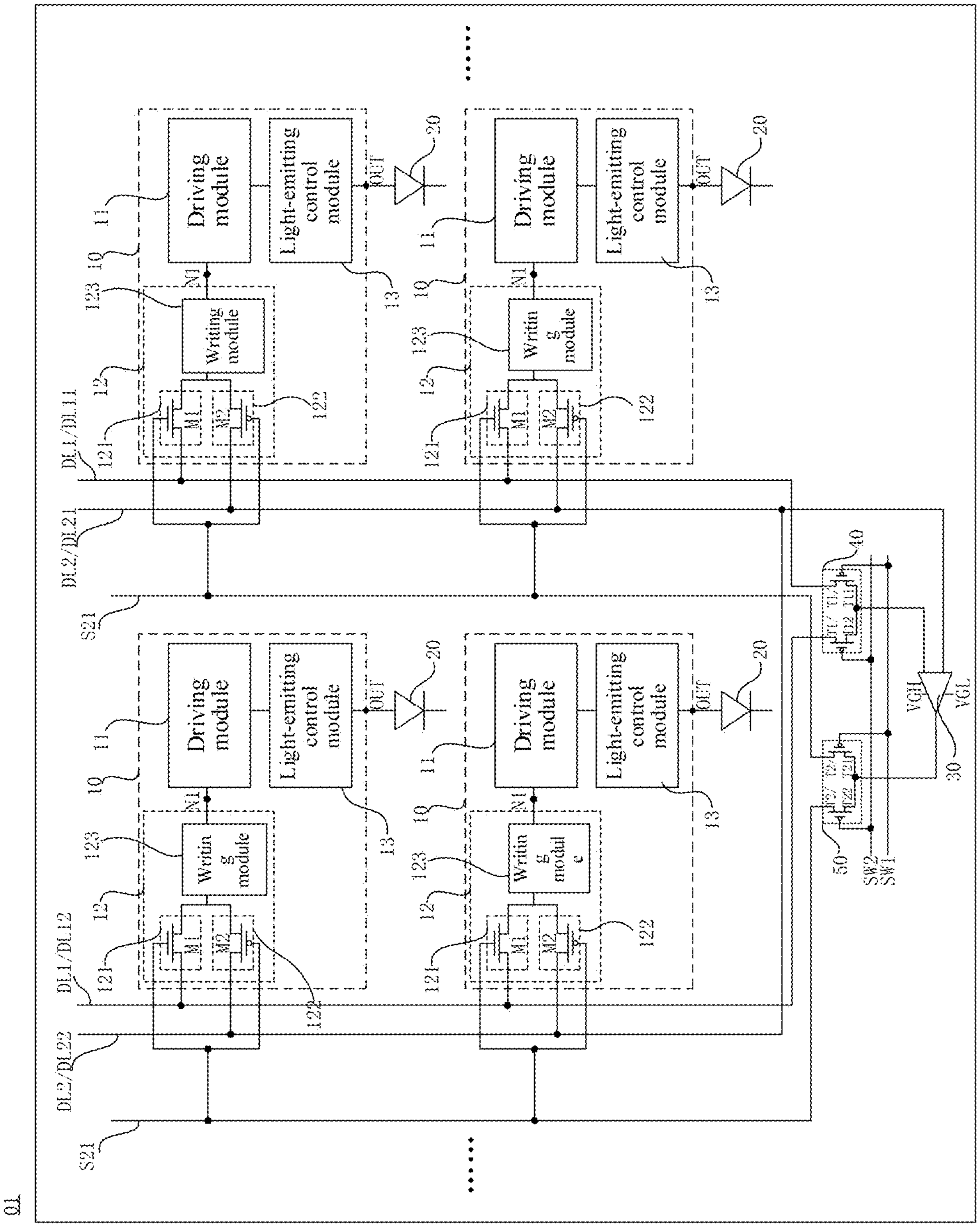
FIG. 21 is a schematic diagram of a display panel according to an embodiment of the present disclosure.

FIG. 21 is a schematic diagram of a display panel according to an embodiment of the present disclosure.

In some embodiments of the present disclosure, as shown in FIG. 21, in the first switch T1 and the second switch T2 respectively electrically connected to the first data line DL1 and the first scanning line S21 that are electrically connected to a same one of the pixel circuits 10, a control terminal of the first switch T1 and a control terminal of the second switch T2 are connected to a same scanning line. This cannot excessively increase the scanning line for controlling the first switch T1 and the second switch T2 in the display panel 01. For example, the first switch T11 and the second switch T21 are electrically connected to the same scanning line SW1, and the first switch T12 and the second switch T22 are electrically connected to the same scanning line SW2.

Figure 22:
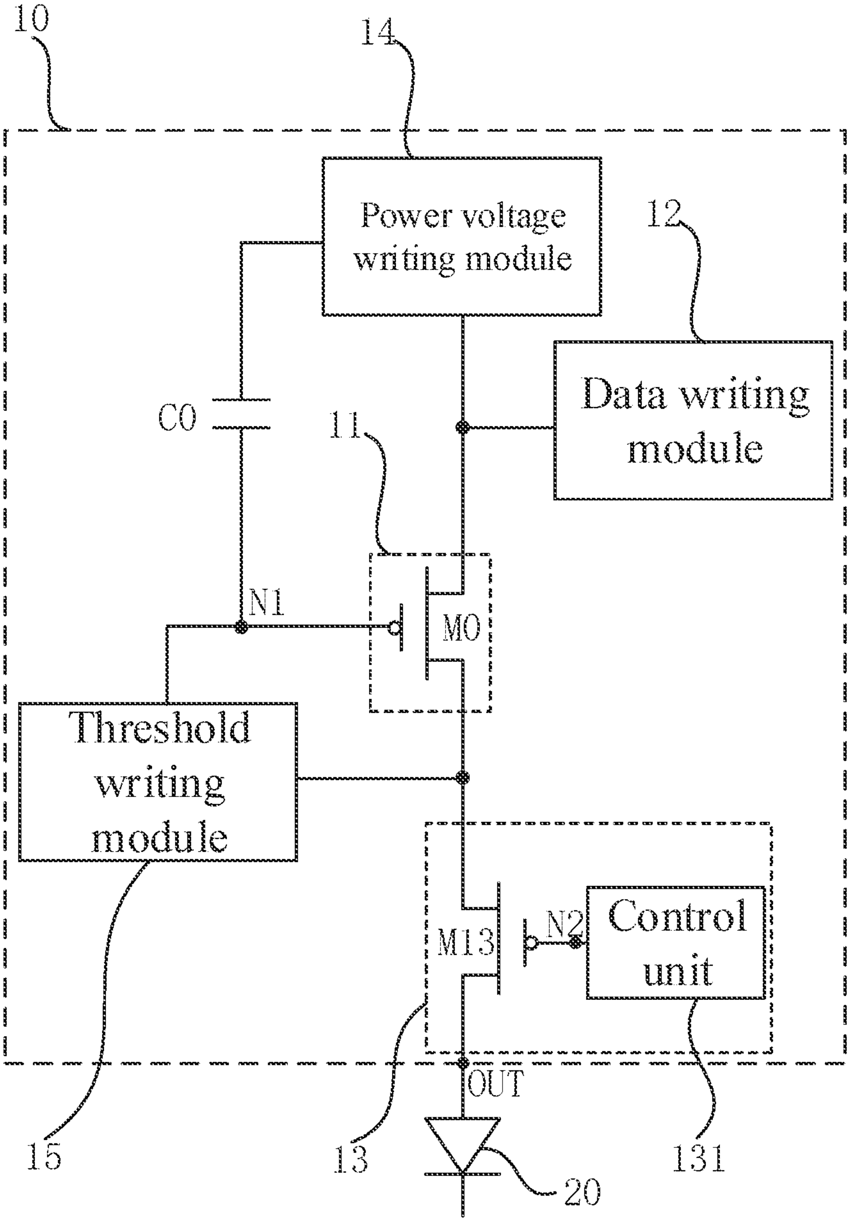
FIG. 22 is a schematic diagram of a pixel circuit in a display panel according to an embodiment of the present disclosure.

FIG. 22 is a schematic diagram of a pixel circuit in a display panel according to an embodiment of the present disclosure.

As shown in FIG. 22, the light-emitting control module 13 in the pixel circuit 10 includes a light-emitting control transistor M13. The light-emitting control transistor M13 includes a first terminal electrically connected to an output terminal of the driving module 11, and a second terminal electrically connected to the light-emitting device 20. When the light-emitting control transistor M13 is turned on, a driving current generated by the driving module 11 is transmitted to the light-emitting device 20.

The light-emitting control module 13 further includes a control unit 131. An output terminal of the control unit 131 is electrically connected to a gate of the light-emitting control transistor M13. A duration taken by the control unit 131 to output a third enable signal to the gate of the light-emitting control transistor M13 in the first working mode W1 is greater than a duration taken by the control unit 131 to output the third enable signal to the gate of the light-emitting control transistor M13 in the second working mode W2. The third enable signal controls the light-emitting control transistor M13 to turn on. The control unit 131 is configured to control turn-on durations of the light-emitting control transistor M13 in the first working mode W1 and the second working mode W2 of the pixel circuit, so that the duration taken by the pixel circuit 10 to transmit the driving current to the light-emitting device 20 in the first working mode W1 is greater than the duration taken by the pixel circuit 10 to transmit the driving current to the light-emitting device 20 in the second working mode W2.

It should be noted that the duration taken by the pixel circuit 10 to transmit the driving current to the light-emitting device 20 in the first working mode W1 refers to a total duration taken by the pixel circuit 10 to transmit the driving current to the light-emitting device 20 in the first one of the first working modes W1. The duration taken by the pixel circuit 10 to transmit the driving current to the light-emitting device 20 in the second working mode W2 refers to a total duration taken by the pixel circuit 10 to transmit the driving current to the light-emitting device 20 in the first one of the second working modes W2.

Figure 23:
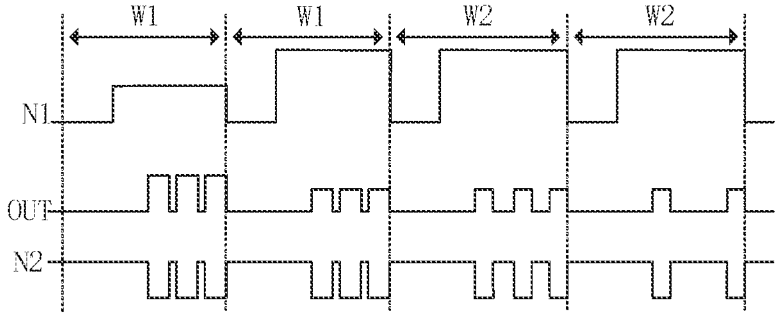
FIG. 23 illustrates a working time sequence of the pixel circuit shown in FIG. 22 according to an embodiment of the present disclosure.
Figure 24:
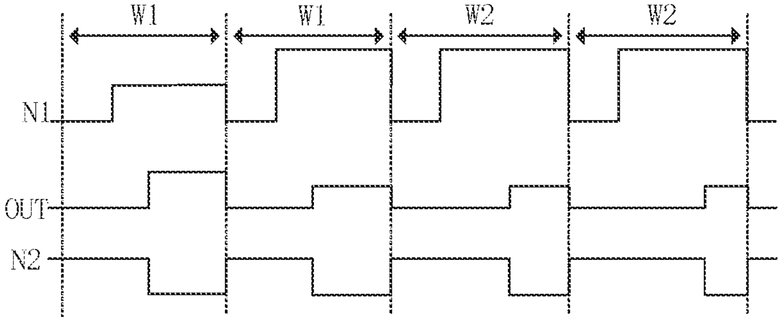
FIG. 24 illustrates another working time sequence of the pixel circuit shown in FIG. 22 according to an embodiment of the present disclosure.

FIG. 23 illustrates a working time sequence of the pixel circuit shown in FIG. 22. FIG. 24 illustrates another working time sequence of the pixel circuit shown in FIG. 22.

The pixel circuit 10 drives the light-emitting device 20 in the first working mode W1 to emit light, which may be realized by multi-pulse driving, and may also be realized by single-pulse driving. As shown in FIG. 23, the pixel circuit 10 may transmit the driving current to the light-emitting device 20 repeatedly in the first working mode W1, namely the output terminal OUT of the pixel circuit 10 outputs the driving current repeatedly. As shown in FIG. 3 and FIG. 24, the pixel circuit 10 may also transmit the driving current to the light-emitting device 20 continuously in the first working mode W1, namely the output terminal OUT of the pixel circuit 10 outputs the driving current continuously.

The pixel circuit 10 drives the light-emitting device 20 in the second working mode W2 to emit light, which may be realized by multi-pulse driving, and may also be realized by single-pulse driving. As shown in FIG. 3 and FIG. 23, the pixel circuit 10 may transmit the driving current to the light-emitting device 20 repeatedly in the second working mode W2, namely the output terminal OUT of the pixel circuit 10 outputs the driving current repeatedly. As shown in FIG. 24, the pixel circuit 10 may also transmit the driving current to the light-emitting device 20 continuously in the second working mode W2, namely the output terminal OUT of the pixel circuit 10 outputs the driving current continuously.

To realize different durations taken by the pixel circuit 10 to transmit the driving current to the light-emitting device 20 in at least two of the second working modes W2, a number of times taken by the pixel circuit 10 to transmit the driving current to the light-emitting device 20 can be adjusted and/or a duration taken by the pixel circuit 10 to transmit the driving current to the light-emitting device 20 in a single time can be adjusted.

A second node N2 is provided between the light-emitting control transistor M13 and the control unit 131. A voltage of the second node N2 represents a voltage written by the light-emitting control transistor M13 into the gate of the light-emitting control transistor M13. For example, the light-emitting control transistor M13 is a P-channel transistor. As can be seen from FIG. 22, FIG. 23 and FIG. 24, a time sequence of the enable signal written by the control unit 131 into the gate of the light-emitting control transistor M13 to turn on the light-emitting control transistor M13 is basically the same as a time sequence taken by the output terminal OUT of the pixel circuit 10 to output the driving current.

Figure 25:
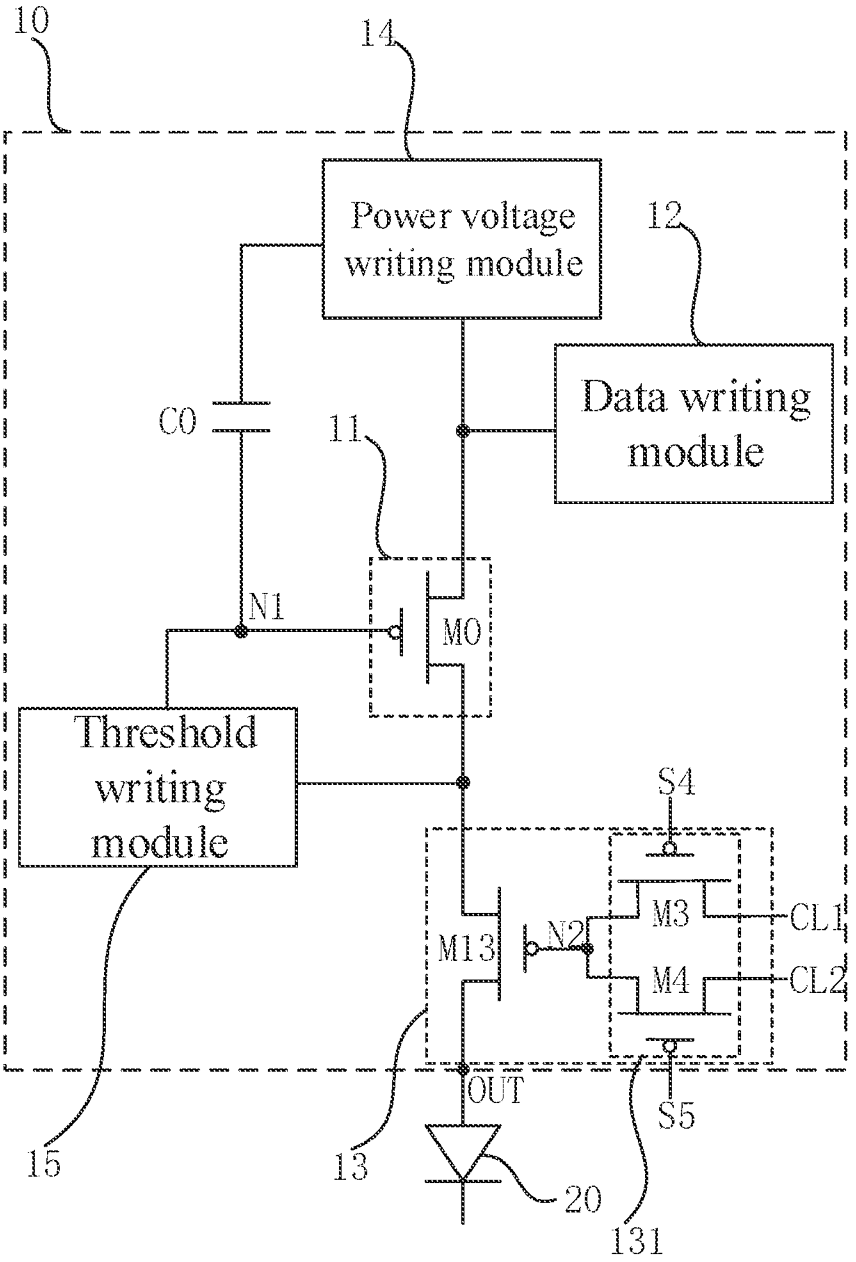
FIG. 25 is a schematic diagram of a pixel circuit in a display panel according to an embodiment of the present disclosure.

FIG. 25 is a schematic diagram of a pixel circuit in a display panel according to an embodiment of the present disclosure.

In an embodiment of the present disclosure, as shown in FIG. 25, the control unit 131 includes a third transistor M3 and a fourth transistor M4. A first terminal of the third transistor M3 is electrically connected to a first control line CL1. A first terminal of the fourth transistor M4 is electrically connected to a second control line CL2. A second terminal of the third transistor M3 and a second terminal of the fourth transistor M4 are electrically connected to the gate of the light-emitting control transistor M13. The third transistor M3 and the fourth transistor M4 can transmit a voltage signal to the gate of the light-emitting control transistor M13, thereby controlling turn-on time and a turn-on duration of the light-emitting control transistor.

Figure 26:
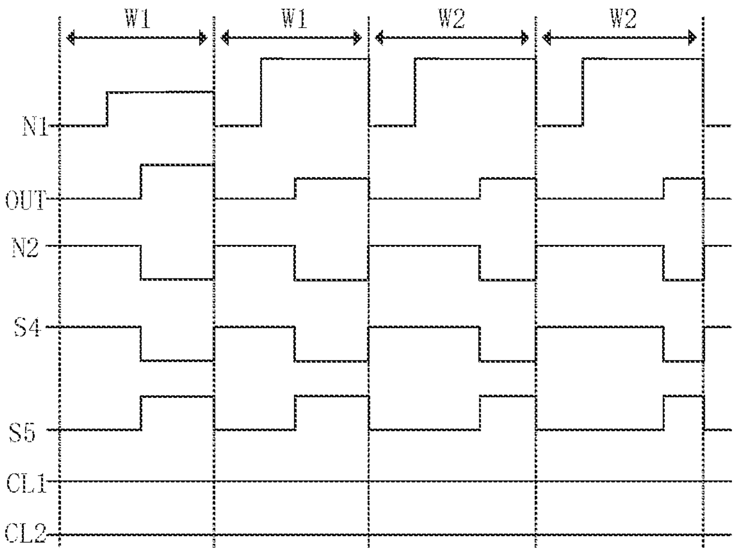
FIG. 26 illustrates a working time sequence of the pixel circuit shown in FIG. 25 according to an embodiment of the present disclosure.

FIG. 26 illustrates a working time sequence of the pixel circuit shown in FIG. 25.

For example, the third transistor M3, the fourth transistor M4 and the light-emitting control transistor M13 are a P-channel transistor, and a gate of the third transistor M3 and a gate of the fourth transistor M4 are respectively electrically connected to a fourth scanning line S4 and a fifth scanning line S5. In response to a low-level signal transmitted by the fourth scanning line S4, the third transistor M3 is turned on. In response to a low-level signal transmitted by the fifth scanning line S5, the fourth transistor M4 is turned on.

Referring to FIG. 25 and FIG. 26, the first control line CL1 transmits the third enable signal (low-level signal) in a light-emitting phase of the first working mode W1 and a light-emitting phase of the second working mode W2. The second control line CL2 is configured to transmit a first disable signal (high-level signal) to an input terminal of the fourth transistor M4. The third enable signal is used to turn on the light-emitting control transistor M13, and the first disable signal is configured to turn off the light-emitting control transistor M13.

A turn-on duration of the third transistor M3 in the first working mode W1 is greater than a turn-on duration of the third transistor M3 in the second working mode W2. That is, a duration taken by the first control line CL1 to transmit the third enable signal to the light-emitting control transistor M13 in the first working mode W1 is greater than a duration taken by the first control line CL1 to transmit the third enable signal to the light-emitting control transistor M13 in the second working mode W2. A turn-on duration of the fourth transistor M4 in the first working mode W1 is shorter than a turn-on duration of the fourth transistor M4 in the second working mode W2. That is, a duration taken by the second control line CL2 to transmit the first disable signal to the light-emitting control transistor M13 in the first working mode W1 is shorter than a duration taken by the first control line CL1 to transmit the first disable signal to the light-emitting control transistor M13 in the second working mode W2.

In some embodiments of the present disclosure, the duration taken by the pixel circuit 10 to transmit the driving current to the light-emitting device 20 can be controlled by controlling the turn-on duration of the third transistor M3. Therefore, this embodiment ensures that the duration taken by the pixel circuit 10 to transmit the driving current to the light-emitting device 20 in the first working mode W1 is greater than the duration taken by the pixel circuit 10 to transmit the driving current to the light-emitting device 20 in the second working mode W2.

In some embodiments of the present disclosure, the second control line CL2 transmits a fixed potential signal. For example, as shown in FIG. 26, the second control line CL2 can transmit a high-level signal all the time.

In some embodiments of the present disclosure, as shown in FIG. 25, the gate of the third transistor M3 and the gate of the fourth transistor M4 are respectively electrically connected to the fourth scanning line S4 and the fifth scanning line S5.

Figure 27:
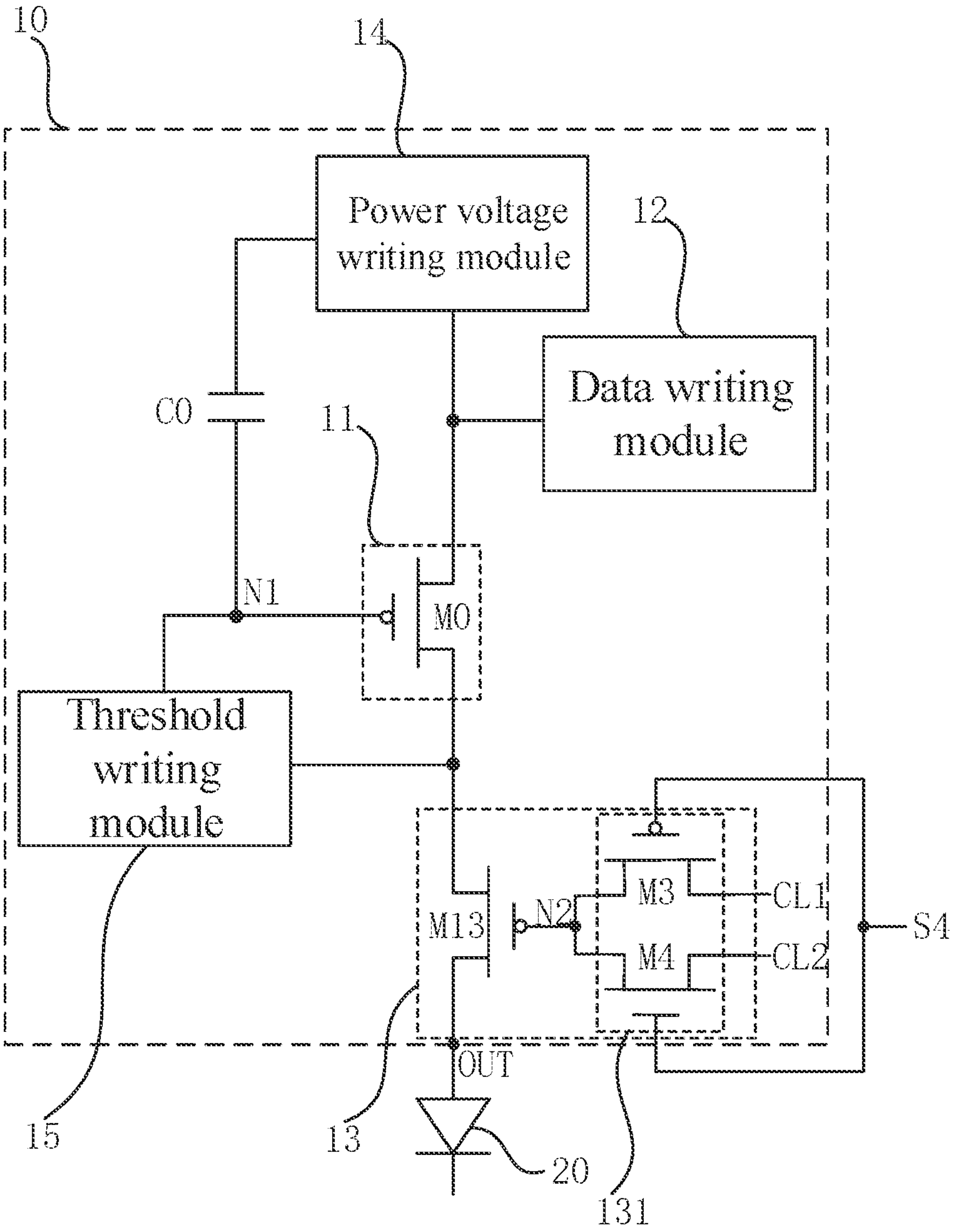
FIG. 27 is a schematic diagram of a pixel circuit in a display panel according to an embodiment of the present disclosure.

FIG. 27 is a schematic diagram of a pixel circuit in a display panel according to an embodiment of the present disclosure.

Figure 28:
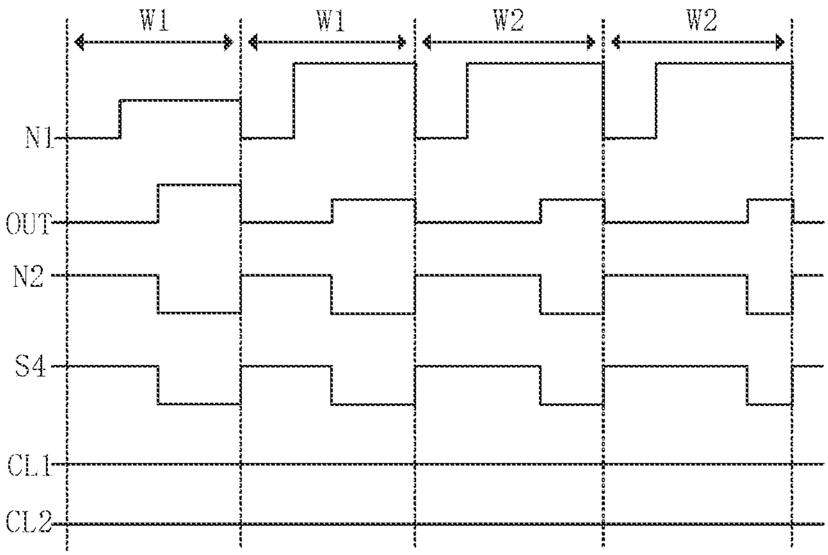
FIG. 28 illustrates a working time sequence of the pixel circuit shown in FIG. 27 according to an embodiment of the present disclosure.

In some embodiments of the present disclosure, as shown in FIG. 27, a channel type of the third transistor M3 is different from a channel type of the fourth transistor M4. The third transistor M3 and the fourth transistor M4 are connected to a same scanning line. For example, as shown in FIG. 27, the third transistor M3 is a P-channel transistor and the fourth transistor M4 is an N-channel transistor. The gate of the third transistor M3 and the gate of the fourth transistor M4 are connected to the fourth scanning line S4. This can reduce a number of the scanning lines in the display panel. FIG. 28 illustrates a working time sequence of the pixel circuit shown in FIG. 27.

Referring to FIG. 27 and FIG. 28, the fourth scanning line S4 transmits an enable signal (low-level signal) to turn on the third transistor M3 when the pixel circuit 10 is required to transmit the driving current to the light-emitting device 20. The fourth scanning line S4 transmits a disable signal (high-level signal) to turn off the third transistor M3 when the pixel circuit 10 is required to transmit the driving current to the light-emitting device 20.

Figure 29:
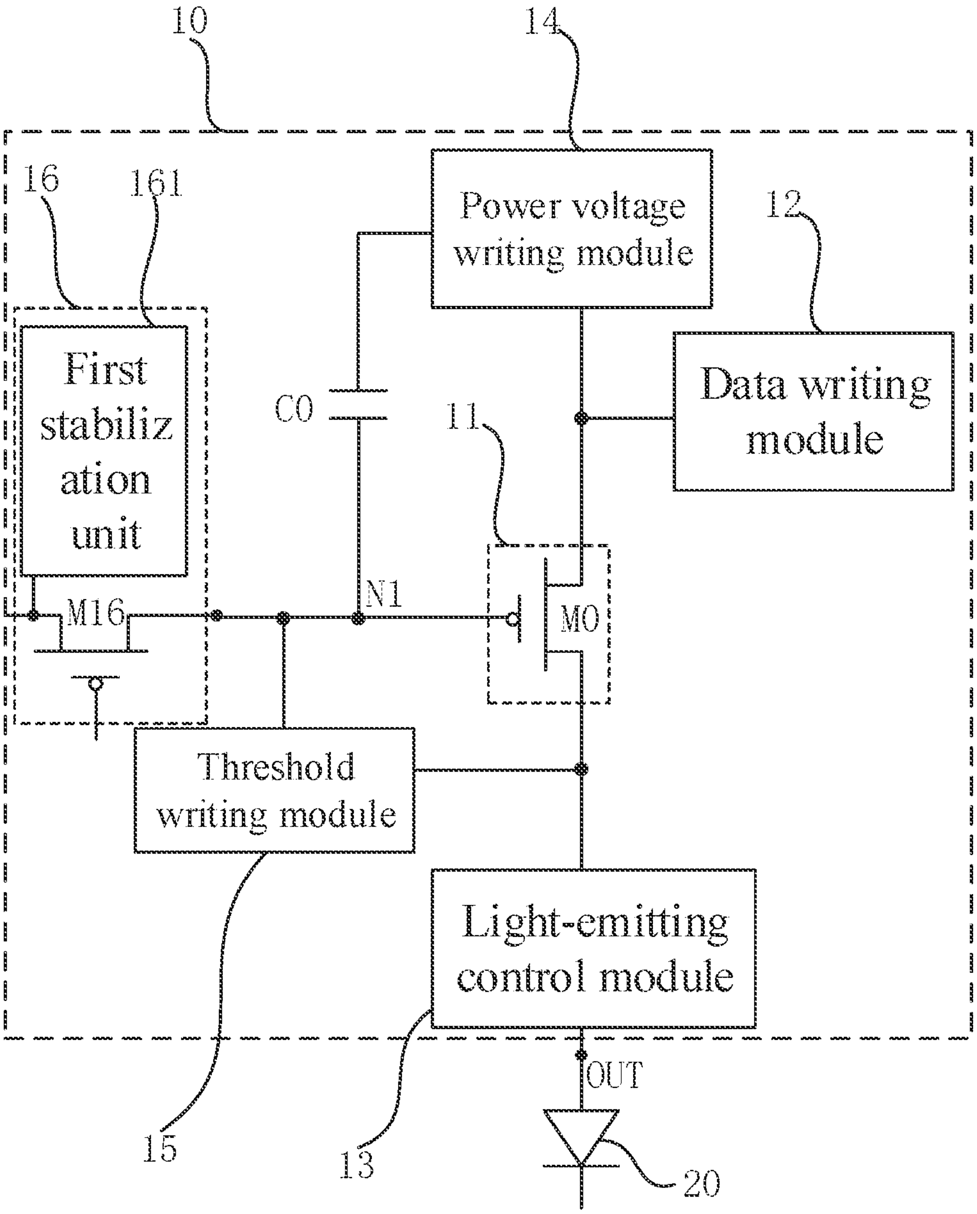
FIG. 29 is a schematic diagram of a pixel circuit in a display panel according to an embodiment of the present disclosure.

FIG. 29 is a schematic diagram of a pixel circuit in a display panel according to an embodiment of the present disclosure.

In an embodiment of the present disclosure, as shown in FIG. 29, the pixel circuit 10 further includes a first reset module 16. The first reset module 16 is electrically connected to a control terminal of the driving module 11 and configured to reset the control terminal of the driving module 11. The first reset module 16 includes a first reset transistor M16. A first terminal of the first reset transistor M16 is electrically connected to the control terminal of the driving module 11. When the first reset transistor M16 is turned on, the first reset transistor M16 transmits a reset voltage to the control terminal of the driving module 11.

When the driving module 11 includes the driving transistor M0, the first reset module 16 is electrically connected to the gate of the driving transistor M0 and configured to reset the gate of the driving transistor M0.

As shown in FIG. 28, the first reset module 16 further includes a first voltage regulator 161. The first voltage regulator 161 is configured to stabilize a potential on the first terminal of the first reset transistor M16 when the first reset transistor M16 is turned off. Since the first terminal of the first reset transistor M16 is electrically connected to the control terminal of the driving module 11, the first voltage regulator 161 can stabilize a potential on the control terminal of the driving module 11 when the first reset transistor M16 is turned off. Therefore, the driving module 11 can generate the relatively stable driving current in the light-emitting phase of each display mode. This relieves a flicker problem of the display panel 01 in low-frequency display.

Figure 30:
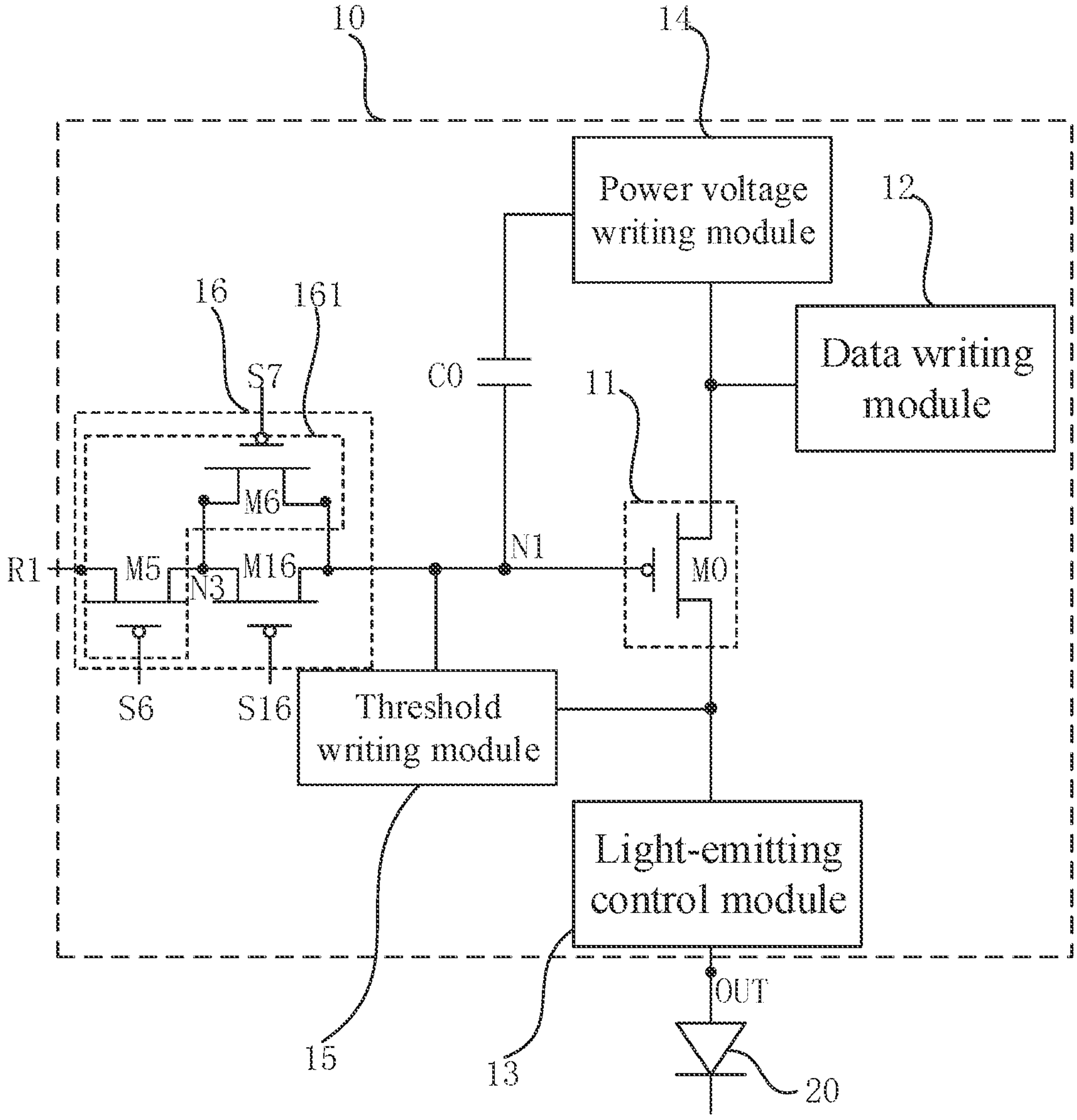
FIG. 30 is a schematic diagram of a pixel circuit in a display panel according to an embodiment of the present disclosure.
Figure 31:
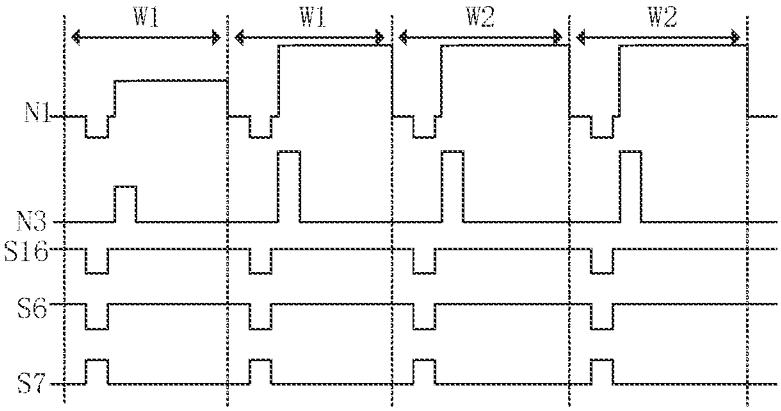
FIG. 31 illustrates a working time sequence of the pixel circuit shown in FIG. 30 according to an embodiment of the present disclosure.

FIG. 30 is a schematic diagram of a pixel circuit in a display panel according to an embodiment of the present disclosure. FIG. 31 illustrates a working time sequence of the pixel circuit shown in FIG. 30.

In some embodiments of the present disclosure, as shown in FIG. 30, the first voltage regulator 161 includes a fifth transistor M5 and a sixth transistor M6.

The fifth transistor M5 includes a first terminal electrically connected to a first reset line R1, and a second terminal electrically connected to a second terminal of the first reset transistor M16. When both the fifth transistor M5 and the first reset transistor M16 are turned on, a reset voltage transmitted on the first reset line R1 can be provided for the control terminal of the driving module 11. For example, the fifth transistor M5 and the first reset transistor M16 are a P-channel transistor, a gate of the fifth transistor M5 is electrically connected to a sixth scanning line S6, and a gate of the first reset transistor M16 is electrically connected to a first reset scanning line S16. Referring to FIG. 30 and FIG. 31, when the sixth scanning line S6 and the first reset scanning line S16 respectively transmit an enable signal (low-level signal) to the fifth transistor M5 and the first reset transistor M16, the fifth transistor M5 and the first reset transistor M16 are turned on, and a reset voltage transmitted on the first reset line R1 is transmitted to the control terminal (first node N1) of the driving module 11.

The sixth transistor M6 includes a first terminal electrically connected to the second terminal of the first reset transistor M16, and a second terminal electrically connected to the first terminal of the first reset transistor M16. The sixth transistor M6 is configured to connect the first terminal of the first reset transistor M16 and the second terminal of the first reset transistor M16 when the first reset transistor M16 is turned off. When the first reset transistor M16 is turned off, a potential on the second terminal of the first reset transistor M16 is the same as a potential on the first terminal of the first reset transistor, and the first reset transistor M16 does not cause current leakage. For example, the sixth transistor M6 and the first reset transistor M16 are a P-channel transistor, a gate of the sixth transistor M6 is electrically connected to a seventh scanning line S7, and a gate of the first reset transistor M16 is electrically connected to a first reset scanning line S16. The second terminal of the first reset transistor M16 and the first terminal of the sixth transistor M6 are electrically connected to a third node N3. A potential of the third node N3 represents a potential on the second terminal of the first reset transistor M16. Referring to FIG. 30 and FIG. 31, when the first reset scanning line S16 transmits a disable signal (high-level signal) to the first reset transistor M16 and the seventh scanning line S7 transmits an enable signal (low-level signal) to the sixth transistor M6, the first reset transistor M16 is turned off and the sixth transistor M6 is turned on, and a potential on the first terminal (first node N1) of the first reset transistor M16 is basically the same as a potential on the second terminal (third node N3) of the first reset transistor M16.

If the first reset transistor M16 is not electrically connected to the sixth transistor M6 and the second terminal of the first reset transistor M16 is directly and electrically connected to the first reset line R1, when the first reset transistor M16 is turned off and the pixel circuit 10 is in the light-emitting phase, a potential on the first terminal of the first reset transistor M16 is a voltage on the control terminal of the driving module 11 and a potential on the second terminal of the first reset transistor M16 is a voltage corresponding to the first reset line R1. Therefore, the first reset transistor M16 is prone to the current leakage, and the potential on the control terminal of the driving module 11 is unstable in the light-emitting phase.

In the technical solution, the fifth transistor M5 and the sixth transistor M6 can cooperate to work. This prevents the current leakage of the first reset transistor M16 in the light-emitting phase of the pixel circuit 10, and can ensure that the first reset module 16 normally transmits a reset voltage to the control terminal of the driving module 11.

In some embodiments of the present disclosure, as shown in FIG. 30, the gate of the fifth transistor M5, the gate of the sixth transistor M6 and the gate of the first reset transistor M15 are respectively electrically connected to different scanning lines. For example, the fifth transistor M5 is electrically connected to the sixth scanning line S6, the sixth transistor M6 is electrically connected to the seventh scanning line S7 and the first reset transistor M16 is electrically connected to the first reset scanning line S16.

Figure 32:
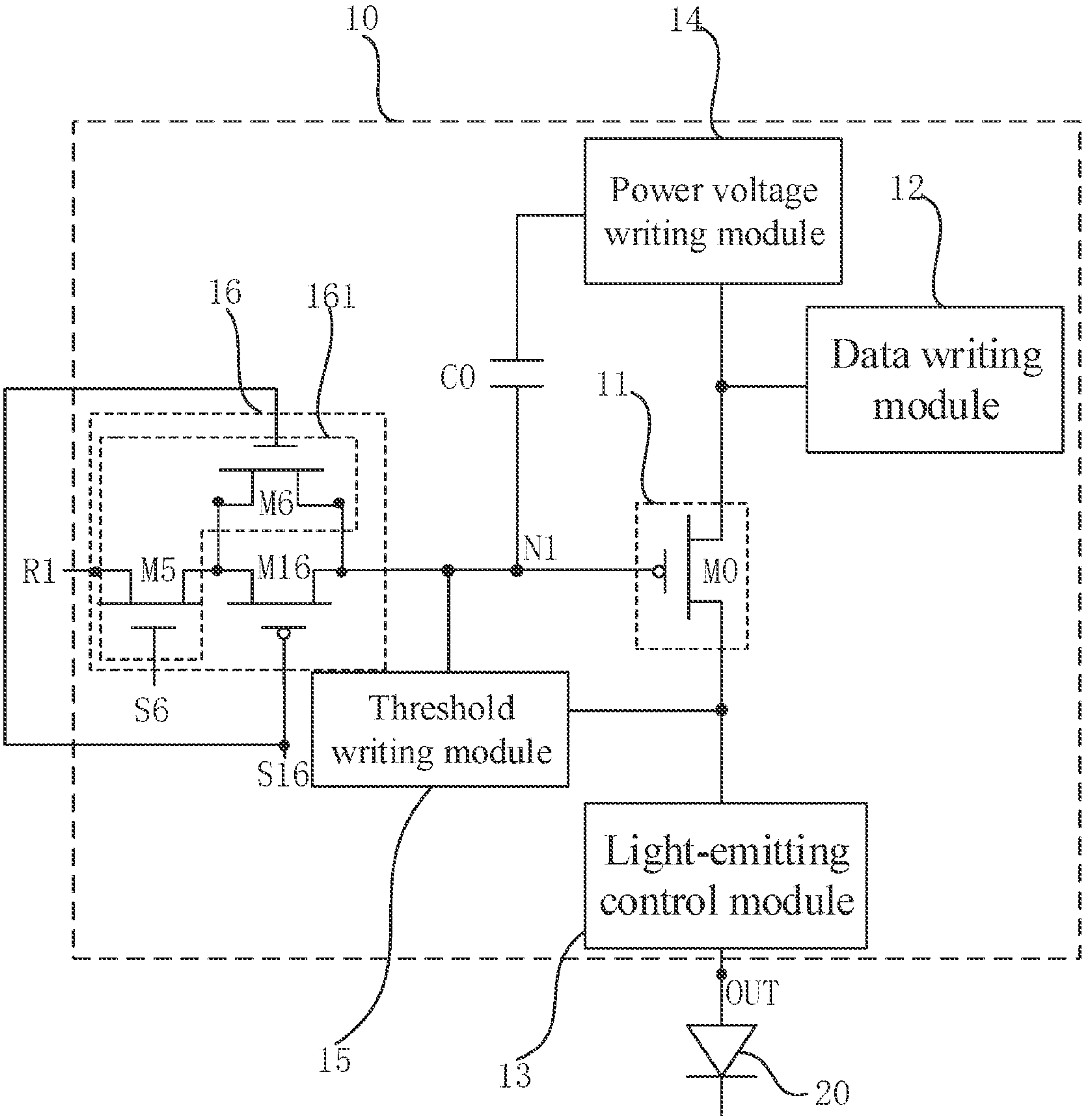
FIG. 32 is a schematic diagram of a pixel circuit in a display panel according to an embodiment of the present disclosure.
Figure 33:
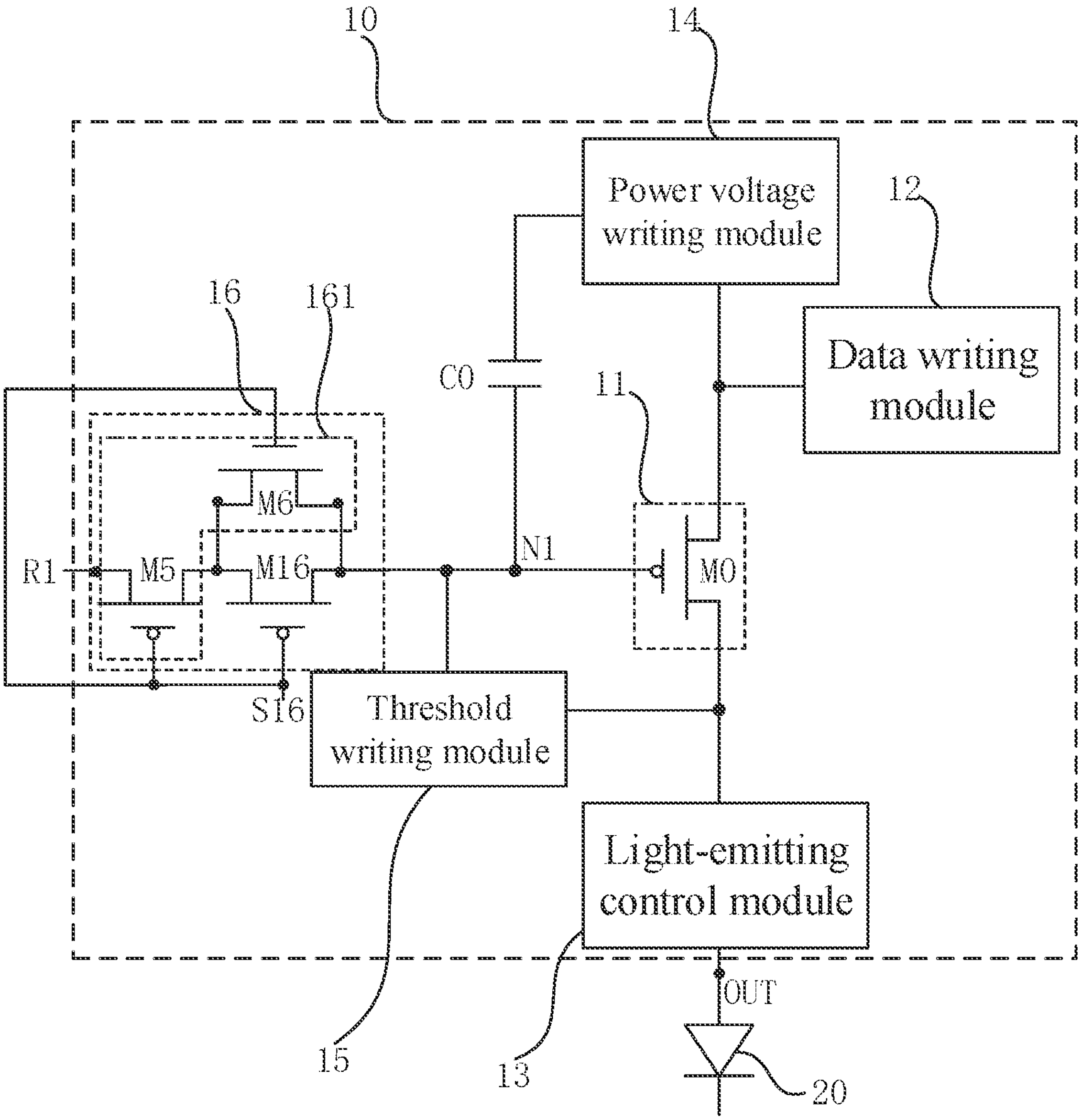
FIG. 33 is a schematic diagram of a pixel circuit in a display panel according to an embodiment of the present disclosure.
Figure 34:
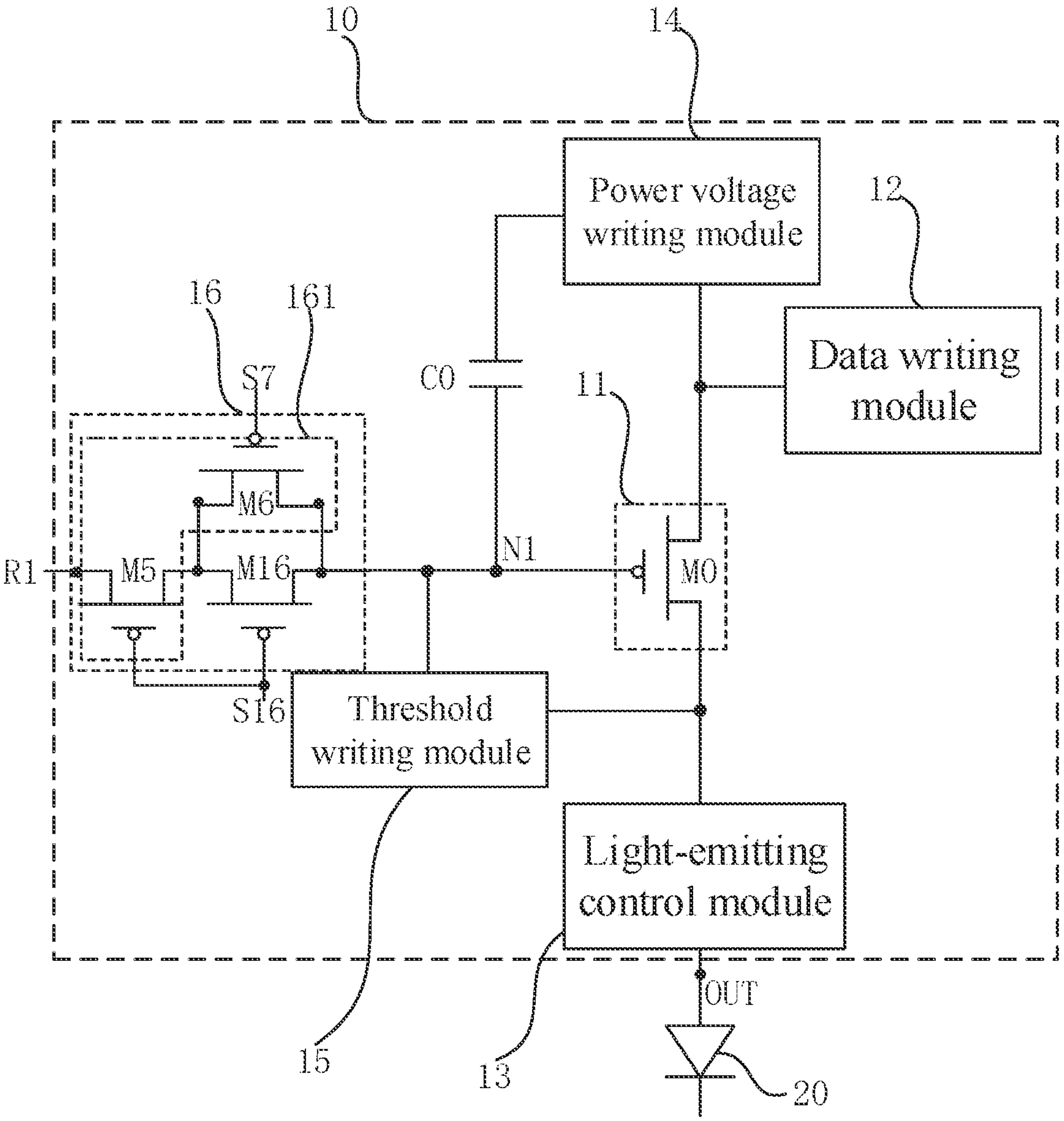
FIG. 34 is a schematic diagram of a pixel circuit in a display panel according to an embodiment of the present disclosure.

FIG. 32 is a schematic diagram of a pixel circuit in a display panel according to an embodiment of the present disclosure. FIG. 33 is a schematic diagram of a pixel circuit in a display panel according to an embodiment of the present disclosure. FIG. 34 is a schematic diagram of a pixel circuit in a display panel according to an embodiment of the present disclosure.

In some embodiments of the present disclosure, as shown in FIG. 32 to FIG. 34, a channel type of the first reset transistor M16 is different from a channel type of the sixth transistor M6, and the first reset transistor M16 and the sixth transistor M6 are electrically connected to the same scanning line S16. And/or, the channel type of the first reset transistor M16 is the same as a channel type of the fifth transistor M5, and the first reset transistor M16 and the fifth transistor M5 are electrically connected to a same scanning line.

For example, as shown in FIG. 32, the channel type of the first reset transistor M16 is different from the channel type of the sixth transistor M6, and the first reset transistor M16 and the sixth transistor M6 are electrically connected to the same scanning line S16. The channel type of the first reset transistor M16 is different from the channel type of the fifth transistor M5, and the first reset transistor and the fifth transistor are electrically connected to different scanning lines. The fifth transistor M5 and the sixth transistor M6 may be an N-channel transistor.

For example, as shown in FIG. 33, the channel type of the first reset transistor M16 is different from the channel type of the sixth transistor M6, and the first reset transistor M16 and the sixth transistor M6 are electrically connected to the same scanning line S16. The channel type of the first reset transistor M16 is the same as the channel type of the fifth transistor M5, and the first reset transistor and the fifth transistor are electrically connected to the same scanning line. The sixth transistor M6 may be an N-channel transistor.

For example, as shown in FIG. 34, the channel type of the first reset transistor M16 is the same as the channel type of the sixth transistor M6, and the first reset transistor M16 and the sixth transistor M6 are electrically connected to different scanning lines. The channel type of the first reset transistor M16 is the same as the channel type of the fifth transistor M5, and the first reset transistor M16 and the fifth transistor M5 are electrically connected to the same scanning line.

The sixth transistor M6 is not limited to the N-channel transistor. The channel type of the first reset transistor M16, the channel type of the fifth transistor M5 and the channel type of the sixth transistor M6 in the same pixel circuit 10 are also not limited to the case shown in FIG. 32 to FIG. 34.

Figure 35:
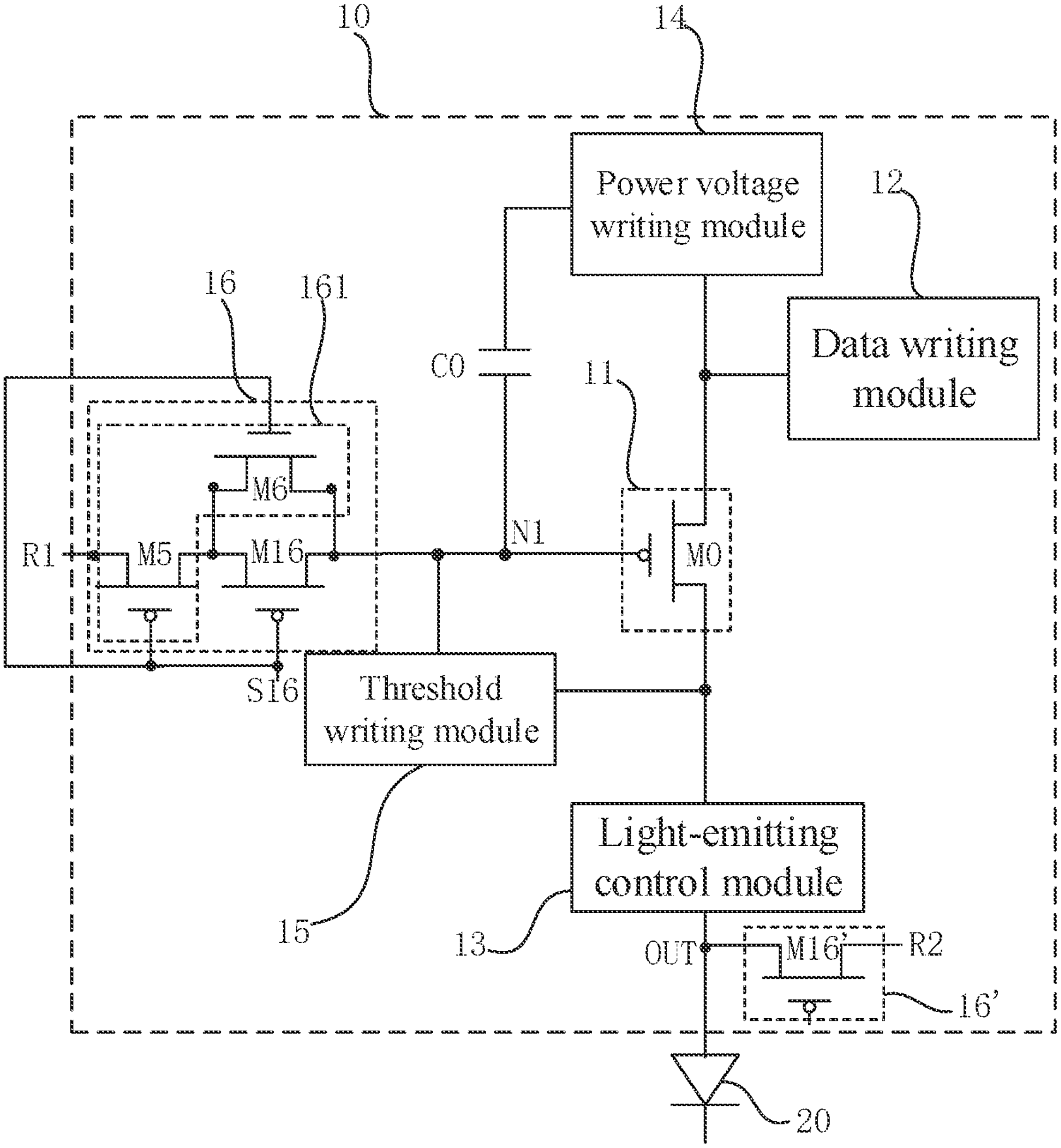
FIG. 35 is a schematic diagram of a pixel circuit in a display panel according to an embodiment of the present disclosure.

FIG. 35 is a schematic diagram of a pixel circuit in a display panel according to an embodiment of the present disclosure.

In an embodiment of the present disclosure, as shown in FIG. 35, the pixel circuit 10 further includes a second reset module 16'. The second reset module is electrically connected to an output terminal OUT of the pixel circuit 10, and configured to reset the light-emitting device 20 electrically connected to the output terminal OUT of the pixel circuit 10. For example, the second reset module 16' includes a second reset transistor M16'. The second reset transistor M16' includes a first terminal electrically connected to the output terminal OUT of the pixel circuit 10 and a second terminal electrically connected to a second reset line R2. When the second reset transistor M16' is turned on, the second reset transistor M16' transmits a reset voltage on the second reset line R2 to the light-emitting device 20 electrically connected to the output terminal OUT of the pixel circuit 10.

In an embodiment of the present disclosure, as shown in FIG. 4, the pixel circuit 10 further includes a threshold writing module 15. The data writing module 12 is electrically connected to an input terminal of the driving module 11. The threshold writing module 15 includes an input terminal electrically connected to an output terminal of the driving module 11, and an output terminal electrically connected to a control terminal of the driving module 11. In a data writing phase of the pixel circuit 10, a data voltage written into the pixel circuit 10 through the data writing module 12 is transmitted to the control terminal of the driving module 11 through the turn-on threshold writing module 15. The data voltage is written into the control terminal of the driving module 11 through the threshold writing module 15, which can prevent threshold drift of the driving transistor M0 from affecting the generated driving current.

When the driving module 11 includes the driving transistor M0, the threshold writing module 15 includes the input terminal electrically connected to the first terminal of the driving transistor M0, and the output terminal electrically connected to the gate of the driving transistor M0.

Figure 36:
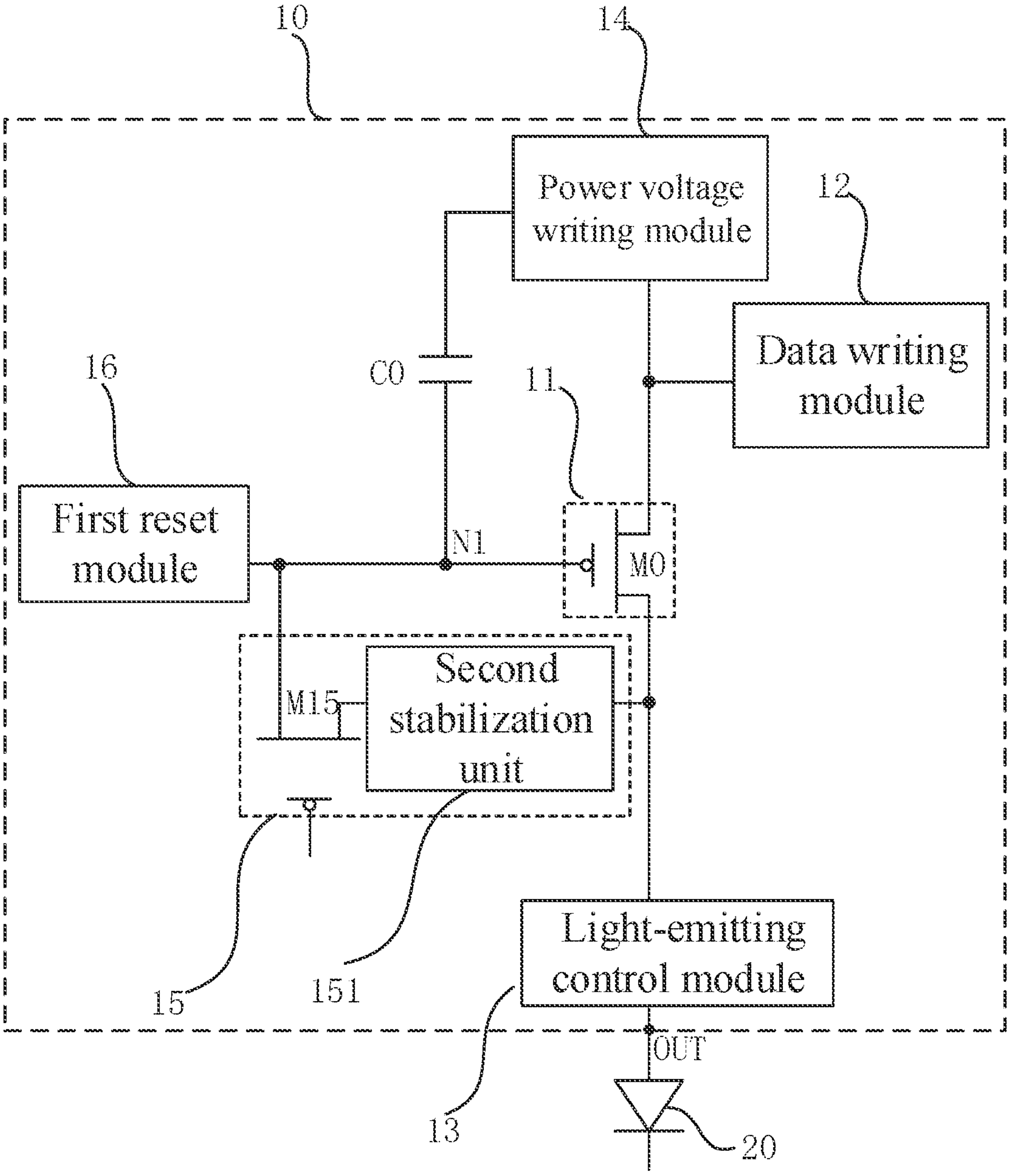
FIG. 36 is a schematic diagram of a pixel circuit in a display panel according to an embodiment of the present disclosure.

FIG. 36 is a schematic diagram of a pixel circuit in a display panel according to an embodiment of the present disclosure.

In some embodiments of the present disclosure, as shown in FIG. 36, the threshold writing module 15 includes a threshold writing transistor M15. A first terminal of the threshold writing transistor M15 is electrically connected to the control terminal of the driving module 11. That is, the first terminal of the threshold writing transistor M15 may be electrically connected to the gate of the driving transistor M0.

In addition, the threshold writing module 15 further includes a second voltage regulator 151. The second voltage regulator 151 is configured to stabilize a potential on the first terminal of the threshold writing transistor M15 when the threshold writing transistor M15 is turned off. Since the first terminal of the threshold writing transistor M15 is electrically connected to the control terminal of the driving module 11, the second voltage regulator 151 can stabilize a potential on the control terminal of the driving module 11 when the threshold writing transistor M15 is turned off. Therefore, the driving module 11 can generate the relatively stable driving current in the light-emitting phase of each display mode. This relieves a flicker problem of the display panel 01 in low-frequency display.

Figure 37:
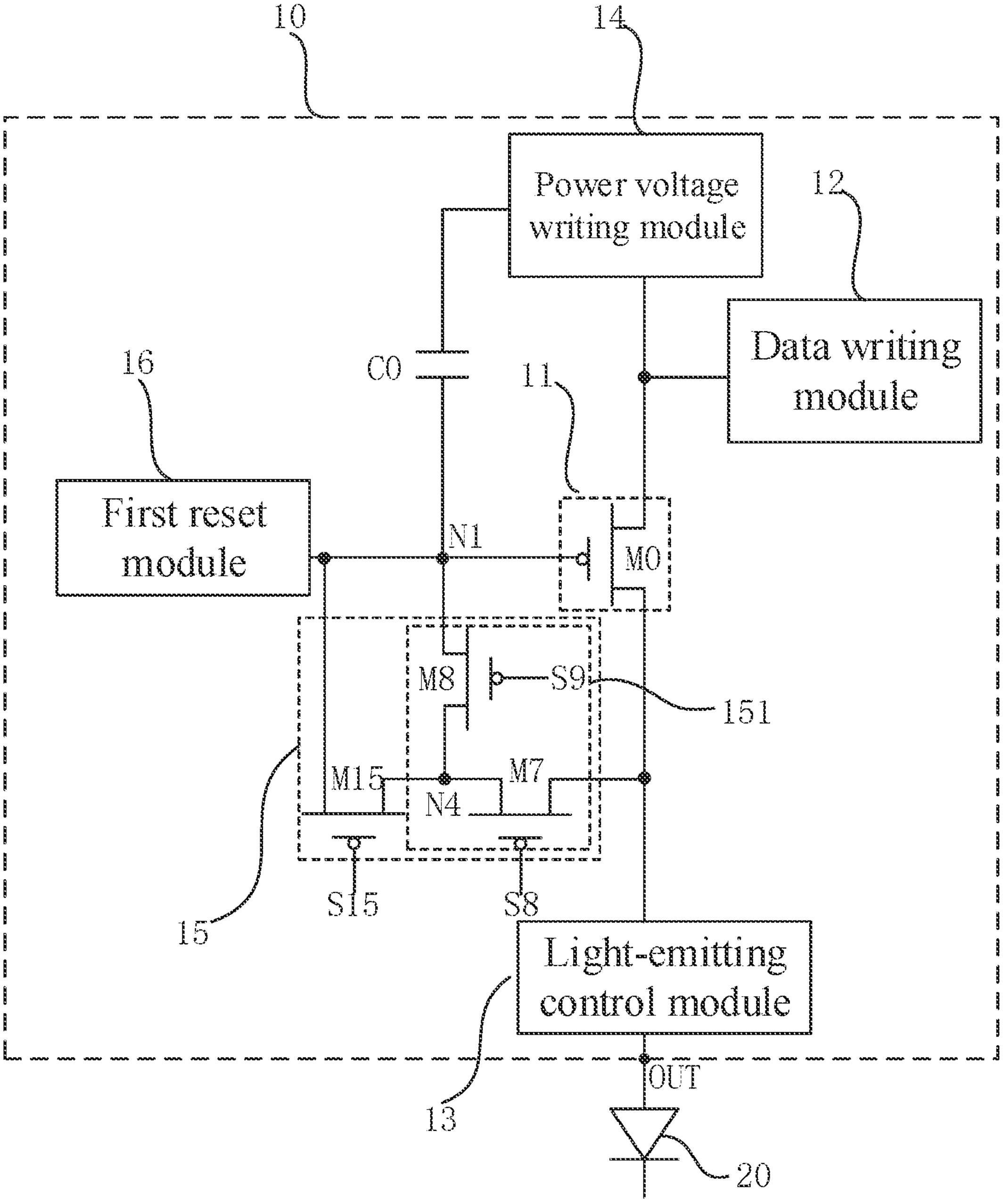
FIG. 37 is a schematic diagram of a pixel circuit in a display panel according to an embodiment of the present disclosure.
Figure 38:
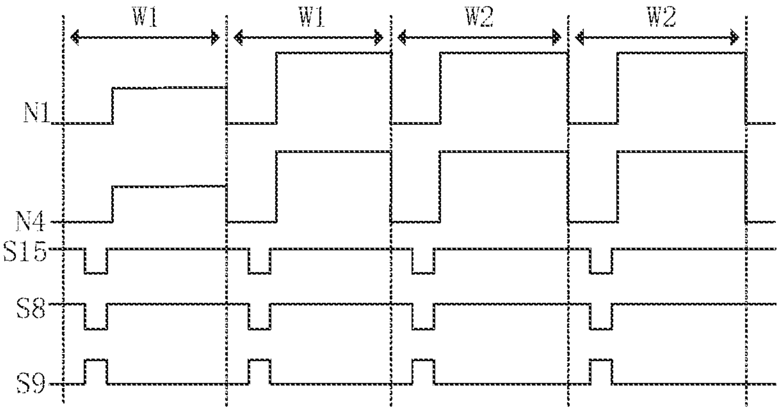
FIG. 38 illustrates a working time sequence of the pixel circuit shown in FIG. 37 according to an embodiment of the present disclosure.

FIG. 37 is a schematic diagram of a pixel circuit in a display panel according to an embodiment of the present disclosure. FIG. 38 illustrates a working time sequence of the pixel circuit shown in FIG. 37.

In some embodiments of the present disclosure, as shown in FIG. 37, the second voltage regulator 151 includes a seventh transistor M7 and an eighth transistor M8.

The seventh transistor M7 includes a first terminal electrically connected to the output terminal of the driving module 11, and a second terminal electrically connected to a second terminal of the threshold writing transistor M15. When the seventh transistor M7 and the threshold writing transistor M15 are turned on, a data voltage transmitted on the output terminal of the driving module 11 can be provided for the control terminal of the driving module 11. For example, the seventh transistor M7 and the threshold writing transistor M15 are a P-channel transistor, a gate of the seventh transistor M7 is electrically connected to an eighth scanning line S8, and a gate of the threshold writing transistor M15 is electrically connected to a threshold writing scanning line S15. Referring to FIG. 37 and FIG. 38, when the eighth scanning line S8 and the threshold writing scanning line S15 respectively transmit an enable signal (low-level signal) to the seventh transistor M7 and the threshold writing transistor M15, the seventh transistor M7 and the threshold writing transistor M15 are turned on, and a data voltage transmitted on the output terminal of the driving module 11 is transmitted to the control terminal (first node N1) of the driving module 11.

The eighth transistor M8 includes a first terminal electrically connected to the second terminal of the threshold writing transistor M15, and a second terminal electrically connected to the first terminal of the threshold writing transistor M15. The eighth transistor M8 is configured to connect the first terminal of the threshold writing transistor M15 and the second terminal of the threshold writing transistor M15 when the threshold writing transistor M15 is turned off. When the threshold writing transistor M15 is turned off, a potential on the second terminal of the threshold writing transistor M15 is the same as a potential on the first terminal of the threshold writing transistor, and the threshold writing transistor M15 does not cause current leakage. For example, the eighth transistor M8 and the threshold writing transistor M15 are a P-channel transistor, a gate of the eighth transistor M8 is electrically connected to a ninth scanning line S9, and a gate of the threshold writing transistor M15 is electrically connected to a threshold writing scanning line S15. The second terminal of the threshold writing transistor M15 and the first terminal of the eighth transistor M8 are electrically connected to a fourth node N4. A potential of the fourth node N4 represents a potential on the second terminal of the threshold writing transistor M15. Referring to FIG. 37 and FIG. 38, when the threshold writing scanning line S15 transmits a disable signal (high-level signal) to the threshold writing transistor M15 and the ninth scanning line S9 transmits an enable signal (low-level signal) to the eighth transistor M8, the threshold writing transistor M15 is turned off and the eighth transistor M8 is turned on, and a potential on the first terminal (first node N1) of the threshold writing transistor M15 is basically the same as a potential on the second terminal (second node N4) of the threshold writing transistor M15.

If the threshold writing transistor M15 is not electrically connected to the eighth transistor M8 and if the second terminal of the threshold writing transistor M15 is directly and electrically connected to the output terminal of the driving module 11, when the threshold writing transistor M15 is turned off and the pixel circuit 10 is in the light-emitting phase, a potential on the first terminal of the threshold writing transistor M15 is a voltage on the control terminal of the driving module 11, and a potential on the second terminal of the threshold writing transistor M15 is a voltage corresponding to the output terminal of the driving module 11. Therefore, the threshold writing transistor M15 is prone to the current leakage, and the potential on the control terminal of the driving module 11 is unstable in the light-emitting phase.

In the technical solution, the seventh transistor M7 and the eighth transistor M8 can cooperate to work. This prevents the current leakage of the threshold writing transistor M15 in the light-emitting phase of the pixel circuit 10, and can ensure that the threshold writing module 15 normally transmits a data voltage to the control terminal of the driving module 11.

In some embodiments of the present disclosure, as shown in FIG. 37, the gate of the seventh transistor M7, the gate of the eighth transistor M8 and the gate of the threshold writing transistor M15 are respectively electrically connected to different scanning lines. For example, the seventh transistor M7 is electrically connected to the eighth scanning line S8, the eighth transistor M8 is electrically connected to the ninth scanning line S9 and the threshold writing transistor M15 is electrically connected to the threshold writing scanning line S15.

Figure 39:
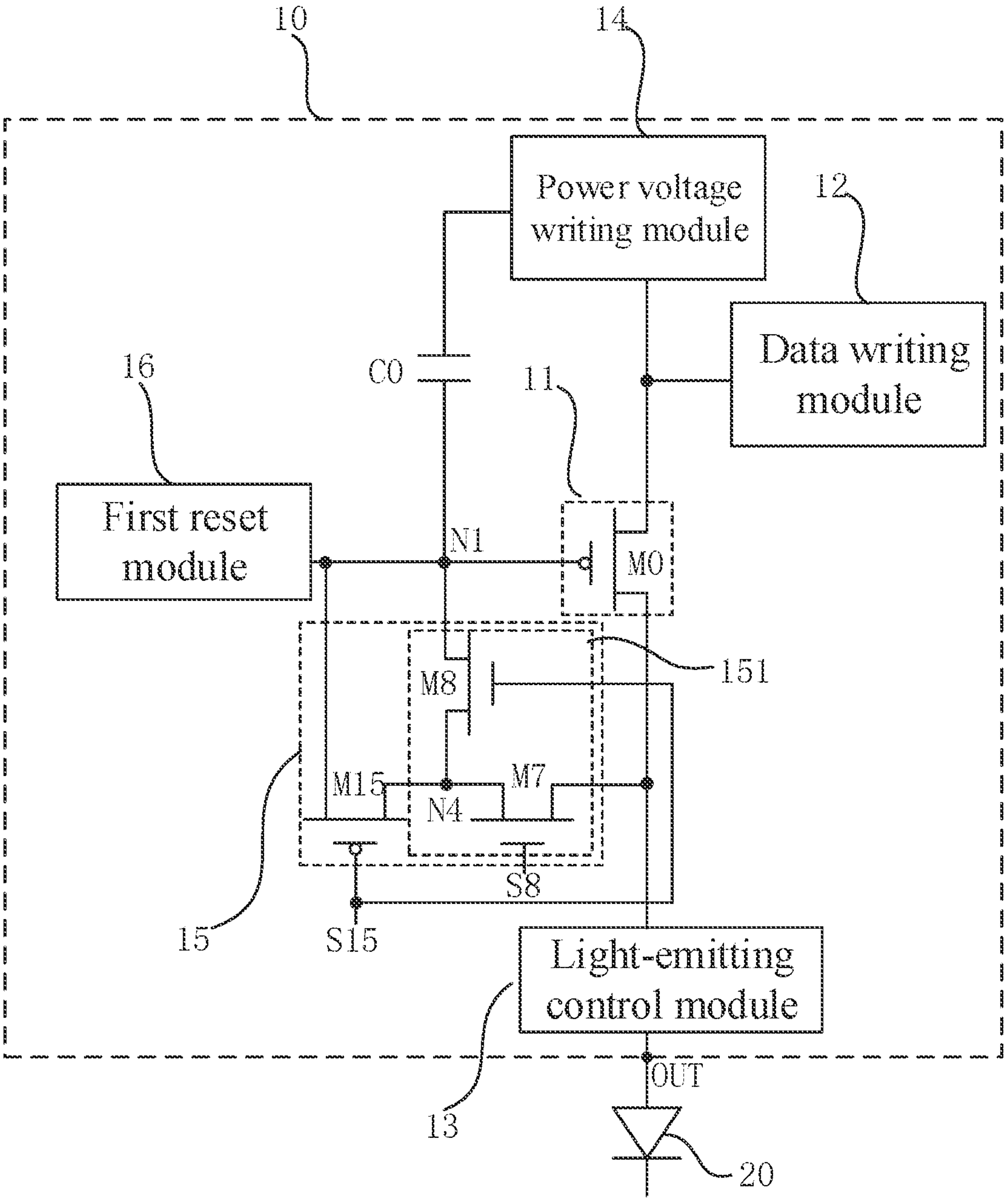
FIG. 39 is a schematic diagram of a pixel circuit in a display panel according to an embodiment of the present disclosure.
Figure 40:
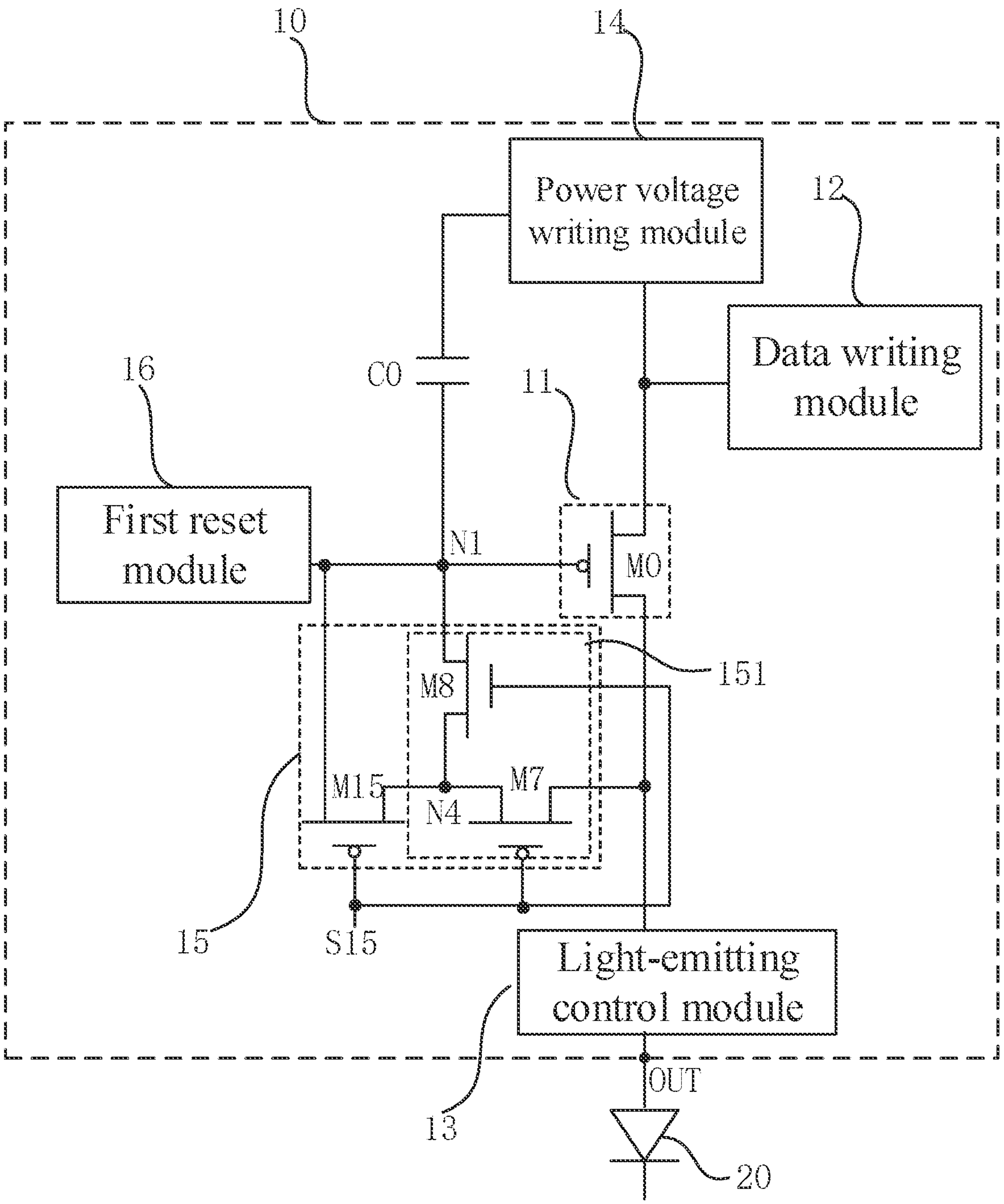
FIG. 40 is a schematic diagram of a pixel circuit in a display panel according to an embodiment of the present disclosure.
Figure 41:
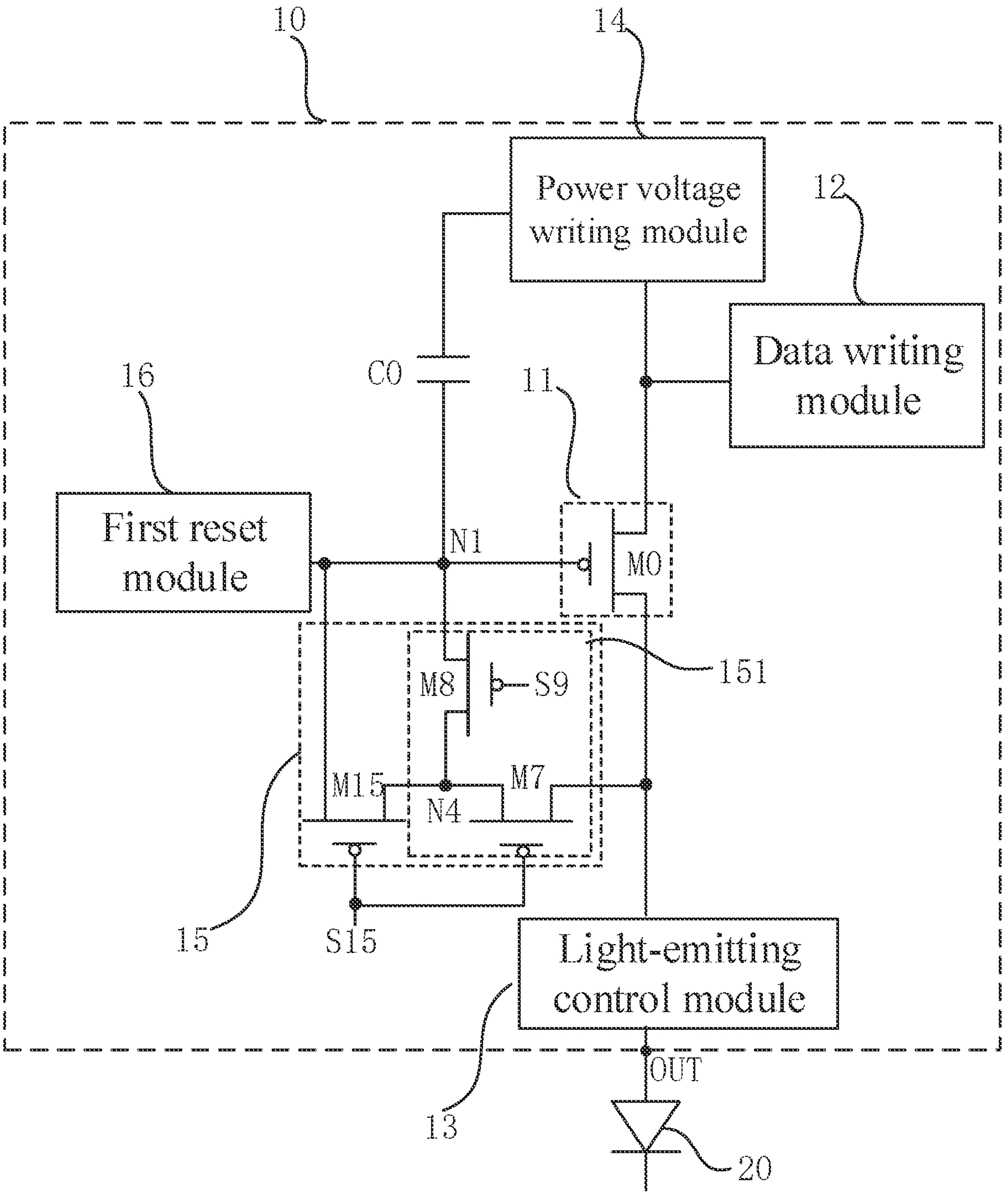
FIG. 41 is a schematic diagram of a pixel circuit in a display panel according to an embodiment of the present disclosure.

FIG. 39 is a schematic diagram of a pixel circuit in a display panel according to an embodiment of the present disclosure. FIG. 40 is a schematic diagram of a pixel circuit in a display panel according to an embodiment of the present disclosure. FIG. 41 is a schematic diagram of a pixel circuit in a display panel according to an embodiment of the present disclosure.

In some embodiments of the present disclosure, as shown in FIG. 39 and FIG. 41, a channel type of the threshold writing transistor M15 is different from a channel type of the eighth transistor M8, and the threshold writing transistor M15 and the eighth transistor M8 are electrically connected to the same scanning line S15. And/or, the channel type of the threshold writing transistor M15 is the same as a channel type of the seventh transistor M7, and the threshold writing transistor M15 and the seventh transistor M7 are electrically connected to the same scanning line.

For example, as shown in FIG. 39, the channel type of the threshold writing transistor M15 is different from the channel type of the eighth transistor M8, and the threshold writing transistor M15 and the eighth transistor M8 are electrically connected to the same scanning line S15. The channel type of the threshold writing transistor M15 is different from the channel type of the seventh transistor M7, and the threshold writing transistor and the seventh transistor are electrically connected to different scanning lines. The eighth transistor M8 may be an N-channel transistor.

For example, as shown in FIG. 40, the channel type of the threshold writing transistor M15 is different from the channel type of the eighth transistor M8, and the threshold writing transistor M15 and the eighth transistor M8 are electrically connected to the same scanning line S15. The channel type of the threshold writing transistor M15 is different from the channel type of the seventh transistor M7, and the threshold writing transistor and the seventh transistor are electrically connected to different scanning lines. The eighth transistor M8 may be an N-channel transistor.

For example, as shown in FIG. 41, the channel type of the threshold writing transistor M15 is the same as the channel type of the eighth transistor M8, and the threshold writing transistor M15 and the eighth transistor M8 are electrically connected to different scanning lines. The channel type of the threshold writing transistor M15 is the same as the channel type of the seventh transistor M7, and the threshold writing transistor M15 and the seventh transistor M7 are electrically connected to the same scanning line.

The eighth transistor M8 is not limited to the N-channel transistor. The channel type of the threshold writing transistor M15, the channel type of the seventh transistor M7 and the channel type of the eighth transistor M8 in the same pixel circuit 10 are also not limited to the case shown in FIG. 39 to FIG. 41.

Figure 42:
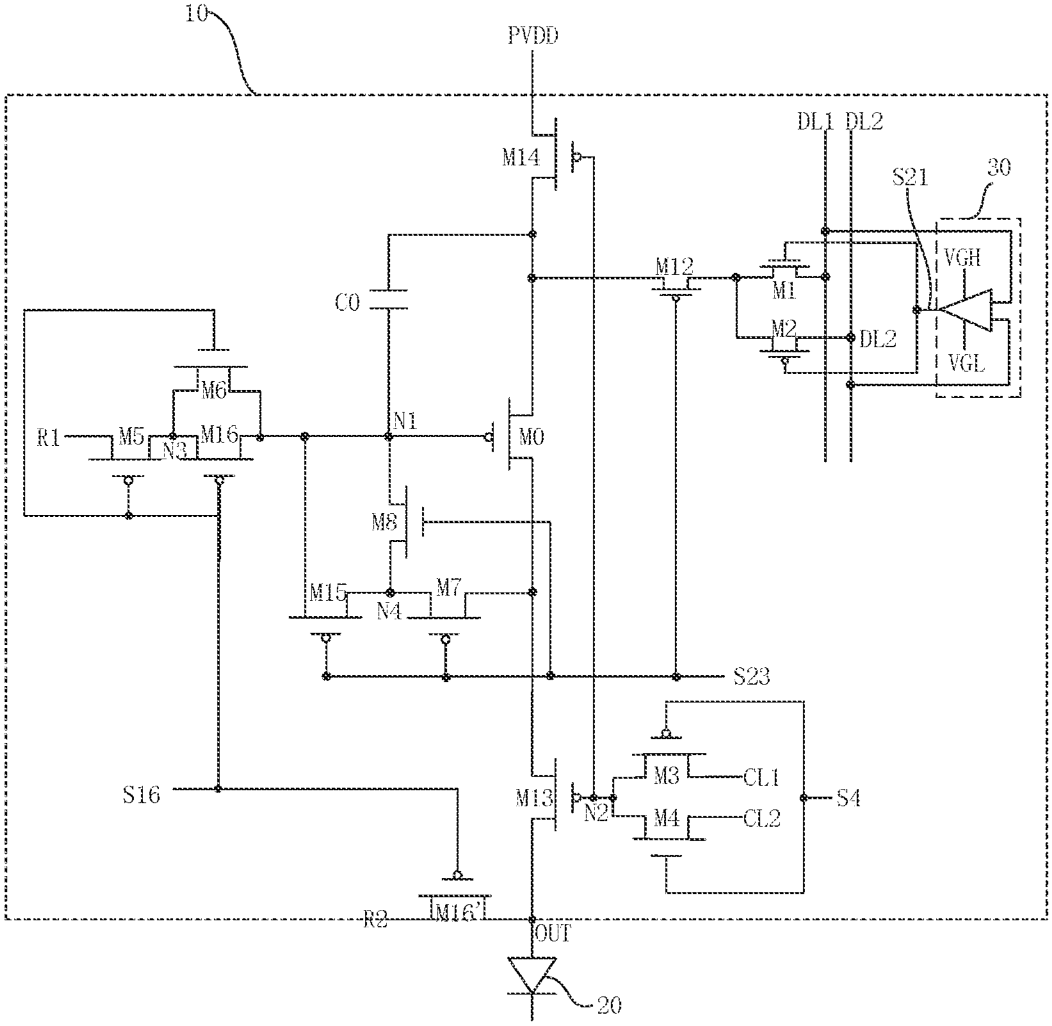
FIG. 42 is a schematic diagram of a pixel circuit in a display panel according to an embodiment of the present disclosure.
Figure 43:
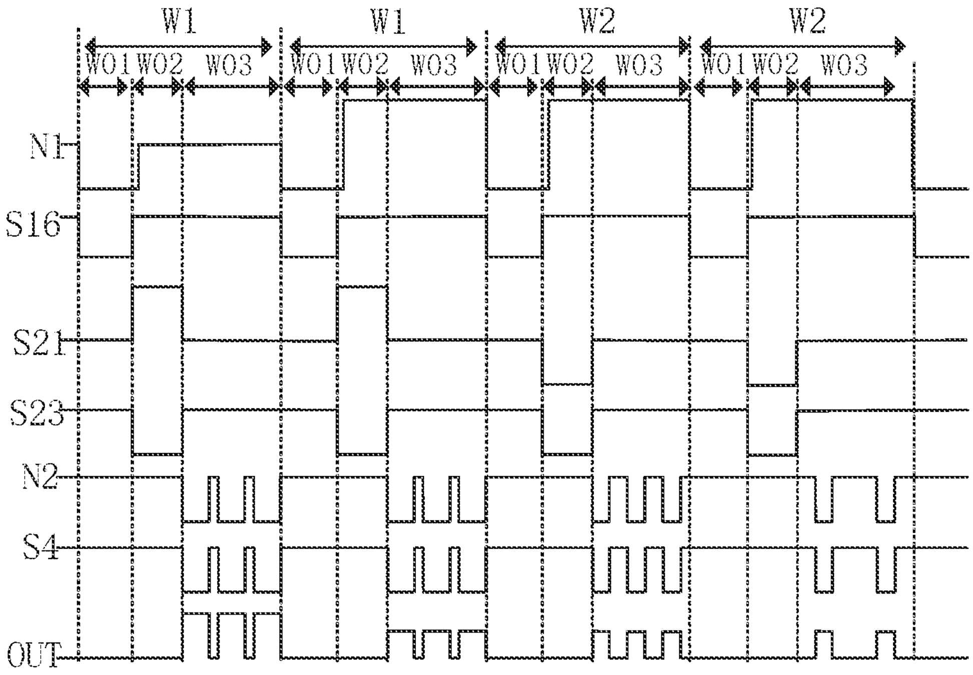
FIG. 43 illustrates a working time sequence of the pixel circuit shown in FIG. 42 according to an embodiment of the present disclosure.

FIG. 42 is a schematic diagram of a pixel circuit in a display panel according to an embodiment of the present disclosure. FIG. 43 illustrates a working time sequence of the pixel circuit shown in FIG. 42.

In an embodiment of the present disclosure, as shown in FIG. 42, the pixel circuit 10 includes a driving transistor M0, a storage capacitor CO, and a power voltage writing transistor M14. The storage capacitor CO is electrically connected to a gate (first node N1) of the driving transistor M0. The power voltage writing transistor M14 includes a first terminal receiving a power voltage PVDD and a second terminal electrically connected to a first terminal of the driving transistor M0. In some embodiments of the present disclosure, the driving transistor M0 and the power voltage writing transistor M0 are a P-channel transistor.

The pixel circuit 10 further includes a writing transistor M12, a first transistor M1, and a second transistor M2. A first terminal of the first transistor M1 is electrically connected to a first data line DL1. A first terminal of the second transistor M2 is electrically connected to a second data line DL2. The writing transistor M12 includes a first terminal electrically connected to a second terminal of the first transistor M1 and a second terminal of the second transistor M2, and a second terminal electrically connected to the first terminal of the driving transistor M0. A gate of the first transistor M1 and a gate of the second transistor M2 are electrically connected to the first scanning line S21. A gate of the writing transistor M12 is electrically connected to a third scanning line S23. A channel type of the first transistor M1 is different from a channel type of the second transistor M2. In some embodiments of the present disclosure, the first transistor M1 is an N-channel transistor, the second transistor M2 is a P-channel transistor, and the writing transistor M12 is the P-type transistor.

The pixel circuit 10 further includes a light-emitting control transistor M13, a third transistor M3, and a fourth transistor M4. A first terminal of the third transistor M3 is electrically connected to a first control line CL1. A first terminal of the fourth transistor M4 is electrically connected to a second control line CL2. A second terminal of the third transistor M3 and a second terminal of the fourth transistor M4 are electrically connected to a gate of the light-emitting control transistor M13. The light-emitting control transistor M13 includes a first terminal electrically connected to a second terminal of the driving transistor M0, and a second terminal electrically connected to the light-emitting device 20. A gate of the third transistor M3 and a gate of the fourth transistor M4 are electrically connected to a fourth scanning line S4. A channel type of the third transistor M3 is different from a channel type of the fourth transistor M4. In some embodiments of the present disclosure, the fourth transistor M4 is an N-channel transistor, the third transistor M3 is a P-channel transistor, and the light-emitting control transistor M13 is the P-type transistor.

The gate of the power voltage writing transistor M14 and the gate of the light-emitting control transistor M13 may be electrically connected to a second node N2.

The pixel circuit 10 further includes a first reset transistor M16, a fifth transistor M5, and a sixth transistor M6. A first terminal of the first reset transistor M16 is electrically connected to the gate of the driving transistor M0. The fifth transistor M5 includes a first terminal electrically connected to a first reset line R1, and a second terminal electrically connected to a second terminal of the first reset transistor M16. The sixth transistor M6 includes a first terminal electrically connected to the second terminal of the first reset transistor M16, and a second terminal electrically connected to the first terminal of the first reset transistor M16. A third node N3 is provided between the fifth transistor M5 and the first reset transistor M16. In some embodiments of the present disclosure, the sixth transistor M6 is an N-channel transistor, the fifth transistor M5 and the first reset transistor M16 are a P-channel transistor, and a gate of the fifth transistor M5, a gate of the sixth transistor M6 and a gate of the first reset transistor M16 are electrically connected to a first reset scanning line S16.

The pixel circuit 10 further includes a second reset transistor M16'. The second reset transistor M16' includes a first terminal electrically connected to the output terminal OUT of the pixel circuit 10, a second terminal electrically connected to a second reset line R2, and a gate electrically connected to the first reset scanning line S16.

The pixel circuit 10 further includes a threshold writing transistor M15, a seventh transistor M7, and an eighth transistor M8. A first terminal of the threshold writing transistor M15 is electrically connected to the gate of the driving transistor M0. The seventh transistor M7 includes a first terminal electrically connected to the second terminal of the driving transistor M0, and a second terminal electrically connected to a second terminal of the threshold writing transistor M15. The eighth transistor M8 includes a first terminal electrically connected to the second terminal of the threshold writing transistor M15, and a second terminal electrically connected to the first terminal of the threshold writing transistor M15. A fourth node N4 is provided between the seventh transistor M7 and the threshold writing transistor M15. In some embodiments of the present disclosure, the seventh transistor M7 and the threshold writing transistor M15 are a P-channel transistor, the eighth transistor M8 is an N-channel transistor, and a gate of the seventh transistor M7, a gate of the eighth transistor M8 and a gate of the threshold writing transistor M15 are electrically connected to the third scanning line S23.

The display panel 01 further includes a comparator module 30. The comparator module 30 includes two input terminals respectively electrically connected to the first data line DL1 and the second data line DL2, and an output terminal electrically connected to the first scanning line S21.

Referring to FIG. 42 and FIG. 43, in a working cycle of one pixel circuit 10, the first working mode W1 and the second working mode W2 include a reset phase w01, a data writing phase w02, and a light-emitting phase w03.

In the reset phase w01, the first reset scanning line S16 transmits a low-level signal. The fifth transistor M5, the first reset transistor M16 and the second reset transistor M16' are turned on. A reset voltage transmitted on the first reset line R1 is transmitted to the gate of the driving transistor M0 through the turn-on fifth transistor M5 and the turn-on first reset transistor M16, so as to reset the gate of the driving transistor M0. A reset voltage on the second reset line R2 is transmitted to the output terminal OUT of the pixel circuit 10 through the turn-on second reset transistor M16', so as to reset the output terminal OUT of the pixel circuit 10 and the light-emitting device 20. The first reset line R1 and the second reset line R2 can be reused.

In a non-reset phase, the first reset scanning line S16 transmits a high-level signal. The fifth transistor M5, the first reset transistor M16 and the second reset transistor M16' are turned off, while the sixth transistor M6 is turned on. A potential of the first node N1 is the same as a potential of the third node N3, so as to reduce current leakage of the first node N1, and ensure that the gate of the driving transistor M0 has a stable potential.

In the data voltage writing phase w02, the third scanning line S23 transmits a low-level signal. The writing transistor M12, the threshold writing transistor M15 and the seventh transistor M7 are turned on. When a data voltage transmitted on the first data line DL1 is smaller than a data voltage transmitted on the second data line DL2, namely in the data writing phase w02 of the first working mode W1, the comparator module 30 transmits a high-level signal VGH to the first scanning line S21 to turn on the first transistor M1, the data voltage transmitted on the first data line DL1 is transmitted to the gate of the driving transistor M0 through the turn-on first transistor M1, writing transistor M12, driving transistor M0, seventh transistor M7 and the threshold writing transistor M15. When the data voltage transmitted on the first data line DL1 is greater than the data voltage transmitted on the second data line DL2, namely in the data writing phase w02 of the second working mode W2, the comparator module 30 transmits a low-level signal VGL to the first scanning line S21 to turn on the second transistor M2, the data voltage transmitted on the second data line DL2 is transmitted to the gate of the driving transistor M0 through the turn-on second transistor M2, writing transistor M12, driving transistor M0, seventh transistor M7 and the threshold writing transistor M15.

In a non-data-voltage writing phase, the third scanning line S23 transmits a high-level signal, so that the writing transistor M12 is turned off. No matter what signal is transmitted on the first data line DL1 and the second data line DL2 and what signal is output by the comparator to the first scanning line S21, since the writing transistor M12 is turned off, a writing error of the data voltage is prevented. The third scanning line S23 transmits a high-level signal, so that the eighth transistor M8 is turned on. A potential of the first node N1 is the same as a potential of the fourth node N4, so as to reduce the current leakage of the first node N1, and ensure that the gate of the driving transistor M0 has a stable potential.

In the light-emitting phase w03, when the fourth scanning line S4 transmits a low-level signal, the third transistor M3 and the power voltage writing transistor M14 are turned on. The power voltage PVDD is transmitted to the first terminal of the driving transistor M0 through the turn-on power voltage writing transistor M14. A low-level signal transmitted by the first control line CL1 is transmitted to the gate of the light-emitting control transistor M13 through the turn-on third transistor M3 to turn on the light-emitting control transistor M13. The driving transistor M0 generates a driving current, and transmits the driving current to the output terminal OUT of the pixel circuit 10, thereby transmitting the driving current to the light-emitting device 20. A duration taken by the fourth scanning line S4 to transmit the low-level signal in the light-emitting phase w03 of the first working mode W1 is greater than a duration taken by the fourth scanning line S4 to transmit the low-level signal in the light-emitting phase w03 of the second working mode W2. Durations taken by the fourth scanning line S4 to transmit the low-level signal in the light-emitting phases w03 of different first working modes W1 are the same. Durations taken by the fourth scanning line S4 to transmit the low-level signal in the light-emitting phases w03 of at least two second working modes W2 are different.

In the non-light-emitting phase, the fourth scanning line S4 transmits a high-level signal, so that the third transistor M3 and the power voltage writing transistor M14 are turned off, while the fourth transistor M4 is turned on. A high-level signal transmitted on the second control line CL2 is transmitted to the gate of the light-emitting control transistor M13 to turn off the light-emitting control transistor M13, thereby preventing accidental light emission of the light-emitting device 20. In addition, when the pixel circuit 10 uses multi-pulse driving to drive the light-emitting device 20 to emit light in the light-emitting phase w03 of the first working mode W1 and/or the light-emitting phase w03 of the second working mode W2, the fourth scanning line S4 can also transmit a high-level signal repeatedly in one light-emitting phase w03.

Figure 44:
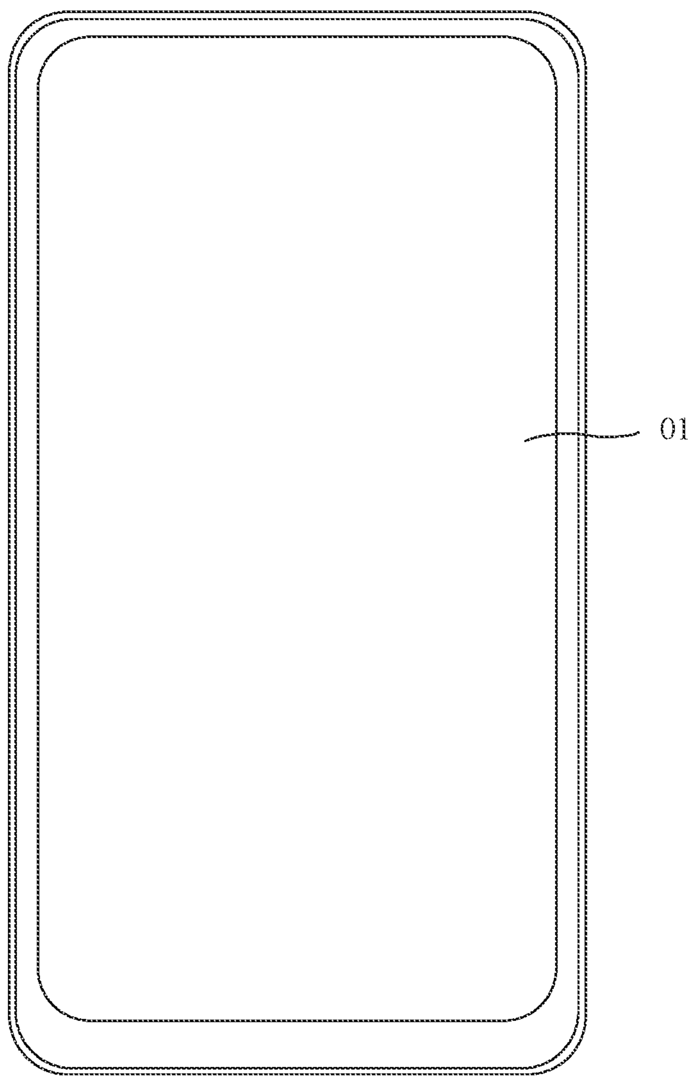
FIG. 44 is a schematic diagram of a display apparatus according to an embodiment of the present disclosure.

FIG. 44 is a schematic diagram of a display apparatus according to an embodiment of the present disclosure.

As shown in FIG. 44, an embodiment of the present disclosure further provides a display apparatus, including the display panel 01 according to any one of the foregoing embodiments. For example, the display apparatus may be an electronic device such as a mobile phone, a computer, an intelligent wearable device (for example, a smart watch), and an in-vehicle display device. This is not limited in the embodiments of the present disclosure.

In some embodiments of the present disclosure, the pixel circuit 10 is driven with the PAM in the first working mode W1 to control the brightness of the light-emitting device 20, and driven with the PWM in the second working mode W2 to control the brightness of the light-emitting device 20. Therefore, the pixel circuit 10 can be driven more flexibly according to the brightness of the electrically connected light-emitting device 20. Therefore, according to the display panel 01 provided by the embodiments of the present disclosure, the pixel circuit 10 is driven by combining PWM and PAM. On one hand, the light-emitting device 20 can have a changeable brightness gradient, so that more display grayscales of the display panel 01 are achieved. On the other hand, the light-emitting device 20 can change brightness at a higher accuracy, so that more accurate display grayscales of the display panel 01 are achieved.

The above are merely exemplary embodiments of the present disclosure, which, as mentioned above, are not used to limit the present disclosure. Whatever within the principles of the present disclosure, including any modification, equivalent substitution, improvement, etc., shall fall into the protection scope of the present disclosure.

What is claimed is:

1. A display panel, comprising:

light-emitting devices; and pixel circuits, wherein an output terminal of one of the pixel circuits is electrically connected to at least one of the light-emitting devices; one of the pixel circuits comprises a driving module, a data writing module, and a light-emitting control module; and both the data writing module and the light-emitting control module are electrically connected to the driving module;

wherein one of the pixel circuits comprises first working modes and second working modes, the pixel circuits are driven with Pulse Amplitude Modulation in the first working modes, the pixel circuits are driven with Pulse Width Modulation in the second working modes; the data writing module transmits different data voltages to the driving module in at least two of the first working modes; data voltages transmitted by the data writing module to the driving module in the second working modes are the same; emission window durations for which the light-emitting control module controls the driving module to transmit a driving current to the light-emitting device are the same in the first working modes, but differ in at least two of the second working modes;

wherein the data writing module comprises a first selection unit and a second selection unit; and the first selection unit is electrically connected to first data lines, and the second selection unit is electrically connected to second data lines;

wherein, in at least two of the first working modes of the pixel circuit, data voltages transmitted by the first data lines are different; and in all second working modes of the pixel circuit, data voltages transmitted by the second data lines are the same;

wherein, in one of the first working modes of the pixel circuit, the first selection unit is turned on and the data writing module transmits a data voltage on the first data lines to the driving module; and, in one of the second working modes of the pixel circuit, the second selection unit is turned on and the data writing module transmits a data voltage on the second data lines to the driving module;

wherein the first selection unit comprises a first transistor, and the second selection unit comprises a second transistor;

wherein a first terminal of the first transistor is electrically connected to one of the first data lines, and a first terminal of the second transistor is electrically connected to one of the second data lines;

wherein the data writing module further comprises a writing module; a second terminal of the first transistor and a second terminal of the second transistor are electrically connected to an input terminal of the writing module; and an output terminal of the writing module is electrically connected to the driving module; and wherein the first transistor comprises a different channel type from the second transistor, and a gate of the first transistor and a gate of the second transistor are connected to one of scanning lines.

2. The display panel according to claim 1, wherein a driving current transmitted by one of the pixel circuits to the light-emitting device in one of the first working modes is greater than or equal to a driving current transmitted by one of the pixel circuits to the light-emitting device in one of the second working modes; and wherein an emission window duration for which the light-emitting control module controls the driving module to transmit the driving current to the light-emitting device in one of the first working modes is greater than an emission window duration for which the light-emitting control module controls the driving module to transmit the driving current to the light-emitting device in one of the second working modes.

3. The display panel according to claim 1, wherein a driving current transmitted by one of the pixel circuits to the light-emitting device in one of the first working modes is greater than or equal to a driving current transmitted by one of the pixel circuits to the light-emitting device in one of the second working modes; and wherein a control terminal of the driving module is configured to receive the data voltage output by the data writing module, and a minimum data voltage transmitted by the data writing module to the driving module in one of the first working modes is smaller than or equal to the data voltage transmitted by the data writing module to the driving module in one of the second working modes.

4. The display panel according to claim 1, further comprising: a comparator module, wherein the gate of the first transistor and the gate of the second transistor are connected to one of first scanning lines;

wherein the first scanning lines are electrically connected to an output terminal of the comparator module; and two input terminals of the comparator module are respectively electrically connected to the first data lines and the second data lines; and wherein the comparator module transmits a first enable signal or a second enable signal to the first scanning lines according to a data voltage transmitted on the first data lines and a data voltage transmitted on the second data lines; the first enable signal controls the first transistor to be turned on; and the second enable signal controls the second transistor to be turned on.

5. The display panel according to claim 4, wherein one of the first data lines is electrically connected to at least two of the pixel circuits; and at least two of the pixel circuits electrically connected to the same first data line are electrically connected to the comparator module.

6. The display panel according to claim 1, further comprising:

a first multiplexing circuit;

a second multiplexing circuit; and a comparator module, wherein the gate of the first transistor and the gate of the second transistor are connected to first scanning lines;

wherein the first multiplexing circuit comprises at least two first switches respectively electrically connected to different first data lines; and the second multiplexing circuit comprises at least two second switches respectively electrically connected to different first scanning lines;

wherein two input terminals of the comparator module are respectively electrically connected to an output terminal of the first multiplexing circuit and the second data line, and an output terminal of the comparator module is electrically connected to an input terminal of the second multiplexing circuit; and wherein the first switch and the second switch respectively electrically connected to one of the first data lines and one of the first scanning lines of one of the pixel circuits are turned on at the same time.

7. The display panel according to claim 6, wherein in the first switch and the second switch respectively electrically connected to one of the first data lines and one of the first scanning lines of one of the pixel circuits, a control terminal of the first switch and a control terminal of the second switch are connected to one of scanning lines.

8. The display panel according to claim 1, wherein at least two second data lines are electrically connected to one another.

9. The display panel according to claim 1, wherein the light-emitting control module comprises a light-emitting control transistor and a control unit;

wherein the light-emitting control transistor comprises a first terminal electrically connected to an output terminal of the driving module, and a second terminal electrically connected to the light-emitting device;

wherein the control unit comprises an output terminal electrically connected to a gate of the light-emitting control transistor; and wherein emission window durations for which the control unit outputs a third enable signal to the gate of the light-emitting control transistor in the first working modes are greater than emission window durations for which the control unit outputs the third enable signal to the gate of the light-emitting control transistor in the second working modes; and the third enable signal controls the light-emitting control transistor to be turned on.

10. The display panel according to claim 9, wherein the control unit comprises a third transistor and a fourth transistor; a first terminal of the third transistor is electrically connected to a first control line; a first terminal of the fourth transistor is electrically connected to a second control line; and a second terminal of the third transistor and a second terminal of the fourth transistor are electrically connected to the gate of the light-emitting control transistor;

wherein the first control line transmits the third enable signal in a light-emitting phase of the first working modes and a light-emitting phase of the second working mode; the second control line is configured to transmit a first disable signal to an input terminal of the fourth transistor; and the first disable signal is a signal for turning off the light-emitting control transistor; and wherein a turn-on duration of the third transistor in the first working mode is greater than a turn-on duration of the third transistor in the second working modes; and a turn-on duration of the fourth transistor in the first working modes is shorter than a turn-on duration of the fourth transistor in the second working modes.

11. The display panel according to claim 10, wherein the third transistor comprises a channel type different from the fourth transistor, and the third transistor and the fourth transistor are connected to one of scanning lines.

12. The display panel according to claim 1, wherein one of the pixel circuits further comprises a first reset module; and the first reset module is electrically connected to a control terminal of the driving module;

wherein the first reset module comprises a first reset transistor; and a first terminal of the first reset transistor is electrically connected to the control terminal of the driving module; and wherein the first reset module further comprises a first voltage regulator configured to electrically stabilize a potential on the first terminal of the first reset transistor when the first reset transistor is turned off.

13. The display panel according to claim 12, wherein the first voltage regulator comprises a fifth transistor and a sixth transistor;

wherein the fifth transistor comprises a first terminal electrically connected to a first reset line, and a second terminal electrically connected to a second terminal of the first reset transistor; and wherein the sixth transistor comprises a first terminal electrically connected to the second terminal of the first reset transistor, and a second terminal electrically connected to the first terminal of the first reset transistor.

14. The display panel according to claim 13, wherein the first reset transistor comprises a different channel type from the sixth transistor, and the first reset transistor and the sixth transistor are electrically connected to one of scanning lines; or, wherein the first reset transistor comprises a same channel type as the fifth transistor, and the first reset transistor and the fifth transistor are electrically connected to one of scanning lines.

15. The display panel according to claim 1, wherein one of the pixel circuits further comprises a threshold writing module; the data writing module is electrically connected to an input terminal of the driving module;

wherein the threshold writing module comprises an input terminal electrically connected to an output terminal of the driving module, and an output terminal electrically connected to a control terminal of the driving module;

wherein the threshold writing module comprises a threshold writing transistor; and a first terminal of the threshold writing transistor is electrically connected to the control terminal of the driving module; and wherein the threshold writing module further comprises a second voltage regulator; and the second voltage regulator is configured to stabilize a potential on the first terminal of the threshold writing transistor when the threshold writing transistor is turned off.

16. The display panel according to claim 15, wherein the second voltage regulator comprises a seventh transistor and an eighth transistor; the seventh transistor comprises a first terminal electrically connected to the output terminal of the driving module, and a second terminal electrically connected to a second terminal of the threshold writing transistor; and the eighth transistor comprises a first terminal electrically connected to the second terminal of the threshold writing transistor, and a second terminal electrically connected to the first terminal of the threshold writing transistor.

17. A display apparatus, comprising a display panel, wherein display panel comprises:

light-emitting devices; and pixel circuits, wherein an output terminal of one of the pixel circuits is electrically connected to at least one of the light-emitting devices; one of the pixel circuits comprises a driving module, a data writing module, and a light-emitting control module; and both the data writing module and the light-emitting control module are electrically connected to the driving module;

wherein one of the pixel circuits comprises first working modes and second working modes, the pixel circuits are driven with Pulse Amplitude Modulation in the first working modes, the pixel circuits are driven with Pulse Width Modulation in the second working modes; the data writing module transmits different data voltages to the driving module in at least two of the first working modes; data voltages transmitted by the data writing module to the driving module in the second working modes are the same; emission window durations for which the light-emitting control module controls the driving module to transmit a driving current to the light-emitting device are the same in the first working modes, but differ in at least two of the second working modes;

wherein the data writing module comprises a first selection unit and a second selection unit; and the first selection unit is electrically connected to first data lines, and the second selection unit is electrically connected to second data lines;

wherein, in at least two of the first working modes of the pixel circuit, data voltages transmitted by the first data lines are different; and in all second working modes of the pixel circuit, data voltages transmitted by the second data lines are the same;

wherein, in one of the first working modes of the pixel circuit, the first selection unit is turned on and the data writing module transmits a data voltage on the first data lines to the driving module; and, in one of the second working modes of the pixel circuit, the second selection unit is turned on and the data writing module transmits a data voltage on the second data lines to the driving module;

wherein the first selection unit comprises a first transistor, and the second selection unit comprises a second transistor;

wherein a first terminal of the first transistor is electrically connected to one of the first data lines, and a first terminal of the second transistor is electrically connected to one of the second data lines;

wherein the data writing module further comprises a writing module; a second terminal of the first transistor and a second terminal of the second transistor are electrically connected to an input terminal of the writing module; and an output terminal of the writing module is electrically connected to the driving module; and wherein the first transistor comprises a different channel type from the second transistor, and a gate of the first transistor and a gate of the second transistor are connected to one of scanning lines.

18. The display panel according to claim 13, wherein the first reset transistor comprises a different channel type from the sixth transistor, and the first reset transistor and the sixth transistor are electrically connected to one of scanning lines; and, wherein the first reset transistor comprises a same channel type as the fifth transistor, and the first reset transistor and the fifth transistor are electrically connected to one of scanning lines.

* * * * *